(12) United States Patent
Zhao et al.

(10) Patent No.: US 7,676,803 B2
(45) Date of Patent: Mar. 9, 2010

(54) METHOD OF DEFINING PACKAGING APPLICABILITY

(75) Inventors: Travis X. Zhao, Austin, TX (US); Angela Qian Chao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1124 days.

(21) Appl. No.: 11/295,319

(22) Filed: Dec. 6, 2005

(65) Prior Publication Data

US 2007/0169081 A1 Jul. 19, 2007

(51) Int. Cl.
G06F 9/44 (2006.01)
(52) U.S. Cl. .................. 717/168; 717/169; 717/170; 717/171; 717/172; 717/173
(58) Field of Classification Search .............. 717/175, 717/168–173
See application file for complete search history.

(56) References Cited

U.S. PATENT DOCUMENTS

| | | | | |
|---|---|---|---|---|
| 5,974,474 | A * | 10/1999 | Furner et al. | 710/8 |
| 6,047,129 | A * | 4/2000 | Frye | 717/172 |
| 6,263,387 | B1 * | 7/2001 | Chrabaszcz | 710/302 |
| 6,282,709 | B1 * | 8/2001 | Reha et al. | 717/175 |
| 7,328,434 | B2 * | 2/2008 | Swanson et al. | 717/168 |
| 7,379,918 | B2 * | 5/2008 | Tan et al. | 705/59 |
| 7,389,504 | B2 * | 6/2008 | Kawano et al. | 717/171 |
| 7,409,463 | B2 * | 8/2008 | Ramachandran | 709/246 |
| 2001/0011348 | A1 * | 8/2001 | Blumenau et al. | 713/100 |
| 2004/0015953 | A1 * | 1/2004 | Vincent | 717/173 |
| 2005/0102660 | A1 * | 5/2005 | Chen et al. | 717/168 |
| 2005/0144616 | A1 * | 6/2005 | Hammond et al. | 717/173 |
| 2005/0210459 | A1 * | 9/2005 | Henderson et al. | 717/168 |
| 2005/0246703 | A1 * | 11/2005 | Ahonen | 717/172 |
| 2006/0248162 | A1 * | 11/2006 | Kawasaki | 709/217 |
| 2007/0032288 | A1 * | 2/2007 | Nelson et al. | 463/16 |
| 2007/0169079 | A1 * | 7/2007 | Keller et al. | 717/168 |

OTHER PUBLICATIONS

Wallace Colyer and Walter Wong, "Depot: A tool for Managing Software Environments", Apr. 10, 1992, CMU.*
Sapuntzakis et al, "Virtual Applicances for Deploying and Maintaining Software", LISA 2003 paper.*
Morehouse et al, "Windows XP Application Compatibility Technologies", Jun. 1st, 2001, Microsoft Corporations, http://www.microsoft.com/technet/prodtechnol/winxppro/plan/appcmpxp/mspx.*
IBM "Introducing IBM Tivoli Configuration Manager", version 4.2, first edition, Oct. 2002, IBM Corporation.*
Eirich, "Beam: A Tool for Flexible Software Update", Sep. 1994, LISA publication.*
Cook, "Workstation Upgrade: WinNT to Win2000", Aug. 2000, www.itp-journals.com.*
Myren et al, "Run-Time Upgradeable Software in a Large Real-Time Telecommunication Sytstem", IEEE publishing, 2001.*

* cited by examiner

Primary Examiner—Wei Y Zhen
Assistant Examiner—Charles Swift
(74) Attorney, Agent, or Firm—Baker Botts L.L.P.

(57) ABSTRACT

An update applicability data model is used to define relationships between an instance of a hardware device and an instance of an associated software component in an inventory context and a packaging context. A hardware device instance is correlated with an instance of the associated software component in the inventory context. Instances of hardware devices are compared in the inventory context. Instances of software components are compared in the inventory context and in the packaging context. Instances of hardware devices are grouped in the inventory context. Instances of software components are grouped in the inventory context and in the packaging context. Whether to update an instance of a software component associated with an instance of a hardware device using the update applicability data model is determined.

2 Claims, 14 Drawing Sheets

A Complex Problem with Many Dimensions and Intersections

US 7,676,803 B2

METHOD OF DEFINING PACKAGING APPLICABILITY

TECHNICAL FIELD OF THE INVENTION

The present disclosure relates generally to information handling systems and, more particularly, to a system and method for updating software, such as firmware, drivers, and the like, using an update applicability data model in information handling systems.

BACKGROUND OF THE INVENTION

As the value and use of information continues to increase, individuals and businesses continually seek additional ways to process and store information. One option available to users of information is an information handling system. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary with regard to the kind of information that is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include one or more computer systems, data storage systems, and networking systems.

One example of an information handling system is a storage system such as a small computer system interface (SCSI) storage system or a serial attached SCSI (SAS) storage system. Generally, a SCSI storage system includes a controller, hard disk drives and a SCSI accessed fault tolerant enclosure (SAF-TE). A SAS storage system may include a controller, hard disk drives and expanders that repeat or regenerate the SCSI signals and may provide electrical isolation. The SAS system typically uses a point-to-point link in lieu of a bus for the SCSI interconnector. The SCSI interconnections generally interact using an expander chip that may be transparent to the software, but not necessarily transparent to the hardware.

The SCSI and SAS storage systems typically follow a standard protocol for electronic interfacing. The protocol allows the storage system to communicate with the peripheral hardware devices such as the hard disks, tape drives, CD-ROM drives and/or DVD drives connected to the system. However, despite adhering to a specification, the connected hardware devices may develop compatibility issues with the system based on the physical configuration of the system. For example, a compatibility issue may arise when a hard disk drive is moved from being attached to an internal backplane of a SCSI server to an attached enclosure. Because the internal backplane and enclosure use the same drive carrier, the hard disk drive is easily relocated between the different locations. However, by moving the hard disk drive between the locations, the physical configuration of the storage system is altered. Based on the new configuration, the hard disk drive may not function properly. For example, based on the new configuration, the hard disk drive may cause data loss that results in customer dissatisfaction. Data loss may occur because the physical interconnect is different between the internal backplane of the SCSI server and the attached external enclosure, for example.

Many information handling systems include one or more devices that process and/or operate on the basis of firmware embedded in or near the device. These devices may include hard disk drives (HDDs), CD-ROM drives, DVD drives, and various other devices and the like that include controllers driven by firmware. Firmware is the program code embedded in a storage device and maintained within or near the device. The firmware for a device most often comprises the operational code for the device. Firmware is often stored in flash memory, which describes a class of memory that is erasable and is able to hold its content without power. From time to time, it may be necessary and/or desirable to update or upgrade the firmware of a device. A firmware upgrade may be necessary to correct errors in, and/or improve the performance of, the device. The process of updating the firmware of a device is sometimes referred to as "flashing" the device, as the firmware update program will replace the software image stored in the flash memory with a second software image.

Examples of information handling systems, such as computers, including servers and workstations, are often grouped in clusters to perform specific tasks. A server cluster is a group of independent servers that is managed as a single system and is characterized by higher availability, manageability, and scalability, as compared with groupings of unmanaged servers. A server cluster typically involves the configuration of a group of independent servers such that the servers appear in the network as a single machine or unit. Server clusters are often managed as a single system, share a common namespace on the network, and are designed specifically to tolerate component failures and to support the addition or subtraction of components in the cluster in a transparent manner. At a minimum, a server cluster includes two or more servers that are connected to one another by a network. The server cluster may include software driven methods by which each client of the server cluster may access the data stored in or controlled by a server of the server cluster. One software application that is used to manage the operation of a server cluster is Microsoft Cluster Service (MSCS), which is produced by the Microsoft Corporation of Redmond, Wash.

In some server cluster configurations, many components of the server cluster are redundant, allowing the component to be replaced or upgraded while the server cluster is online in the network and without affecting the operations and/or services provided by the server cluster to the clients on the network. Server clusters often include a shared storage element in which each drive of shared storage is accessible by each node, or server, of the server cluster. From time to time, the firmware and/or the drivers associated with the storage drives comprising the shared storage must be updated, for example. The process of updating the firmware and/or the drivers of a storage drive may involve taking the storage drive down or offline and updating the firmware and/or the drivers. This step may be followed by a reboot of the storage drive in which the storage drive is placed back in service in the shared storage of the server cluster.

The firmware and/or the driver update process is an important element of the overall system life cycle management of information handling systems generally. The processes invovled in managing the update changes typically consist of the following steps: (1) inventorying the firmware and/or driver version or versions currently installed on the information handling system; (2) comparing the inventory with a defined set of update packages to determine which firmware and/or driver version(s) need to be updated; and (3) deploying changes to the firmware and/or driver version(s) needing to be updated using selected update packages. One important aspect of enabling the comparisons made in step (2) is to figure out programmatically which update packages are applicable to what components of the information handling system as well as the version supercedence of the underlying software components, such as the firmware and/or drivers.

Among the problems encountered conventionally are that there are no industry standards on hardware update applicability. The applicability of the update package varies from component to component and from vendor to vendor. Furthermore, hardware applicability rules are defined and implemented through programming that varies from vendor to vendor and is very difficult to maintain. Moreover, the update applicability rules are handled differently across different layers of the software stack, for example, with respect to application, device driver, and firmware.

SUMMARY OF THE INVENTION

In accordance with the present disclosure, a system and method for updating software in an information handling system are disclosed. In one aspect, the method comprises using an update applicability data model in an information handling system to define a plurality of relationships between at least one instance of at least one hardware device and at least one instance of at least one associated software component in at least one of an inventory context and a packaging context. The method also comprises correlating the at least one instance of the at least one hardware device with the at least one instance of the at least one associated software component in the inventory context. The method also comprises comparing a first instance of a first hardware device with a second instance of a second hardware device in the inventory context. The method also comprises comparing a first instance of a first software component with a second instance of a second software component in the inventory context. The method also comprises comparing a third instance of a third software component in the inventory context with a first instance of a first software component in the packaging context. The method also comprises comparing a second instance of a second software component with a third instance of a third software component in the packaging context. The method also comprises grouping the first instance of the first hardware device and the second instance of the second hardware device in the inventory context. The method also comprises grouping the first instance of the first software component, the second instance of the second software component, and the third instance of the third software component in the inventory context and the first instance of the first software component, the second instance of the second software component, and the third instance of the third software component in the packaging context. The method also comprises determining whether to update the at least one instance of the at least one associated software component associated with the at least one instance of the at least one hardware device using the update applicability data model.

In another aspect, the method comprises using an update applicability data model in an information handling system to define a plurality of relationships between at least one instance of at least one hardware device and at least one instance of at least one associated software component in at least one of an inventory context comprising an inventory of software installed on at least one server and a packaging context comprising a catalog of released software packages. The method also comprises correlating the at least one instance of the at least one hardware device with the at least one instance of the at least one associated software component in the inventory context. The method also comprises comparing a first instance of a first hardware device with a second instance of a second hardware device in the inventory context. The method also comprises comparing a first instance of a first software component with a second instance of a second software component in the inventory context. The method also comprises comparing a third instance of a third software component in the inventory context with a first instance of a first software component in the packaging context. The method also comprises comparing a second instance of a second software component with a third instance of a third software component in the packaging context. The method also comprises grouping the first instance of the first hardware device and the second instance of the second hardware device in the inventory context. The method also comprises grouping the first instance of the first software component, the second instance of the second software component, and the third instance of the third software component in the inventory context and the first instance of the first software component, the second instance of the second software component, and the third instance of the third software component in the packaging context. The method also comprises determining whether to update the at least one instance of the at least one associated software component associated with the at least one instance of the at least one hardware device using the update applicability data model.

A system that may be used with various embodiments of a method for updating software in an information handling system may include at least one server, a raw inventory data object, a correlated inventory data object, a compared inventory data object, a package(s) definition data object, a bundle definition data object, a repository manifest data object, at least one IDrive with MetaData, and at least one software update package having a payload and at least one image file. Data flow and/or transformation within such a system may include inventory collection from the at least one server into the raw inventory data object, inventory correlation from the raw inventory data object and the repository manifest data object into the correlated inventory data object, and version comparison and/or dependency checking from the correlated inventory data object and the package(s) definition data object into the compared inventory data object. Further data flow and/or transformation in such a system may include packaging from the at least one IDrive with MetaData and the at least one software update package into the package(s) definition data object. Bidirectional data flows and/or transformations in such a system may include bundling between the package(s) definition data object and the bundle definition data object, bundle management between the bundle definition data object and the repository manifest data object, and package management between the repository manifest data object and the package(s) definition data object.

The system and method disclosed herein are advantageous in that, in various illustrative embodiments, software may be updated in an information handling system in a way that is completely data driven. The system and method disclosed herein are further advantageous in that, in various illustrative embodiments, software may be updated in an information handling system in a way that is independent of an operating system (OS) and/or a vendor. Other technical advantages will be apparent to those of ordinary skill in the art having the benefit of the present disclosure and in view of the following specification, claims, and drawings.

BRIEF DESCRIPTION OF THE DRAWINGS

The following figures form part of the present specification and are included to further demonstrate certain aspects of the present invention, and should not be used to limit or define the present invention. The present invention may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which the leftmost significant digit(s) in the reference numerals denote(s) the first figure in which the respective reference numerals appear, wherein.

It is to be noted, however, that the appended drawings illustrate only typical embodiments of the present invention and are, therefore, not to be considered limiting of the scope of the present invention, as the present invention may admit to other equally effective embodiments.

DETAILED DESCRIPTION OF EXEMPLARY EMBODIMENTS OF THE INVENTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
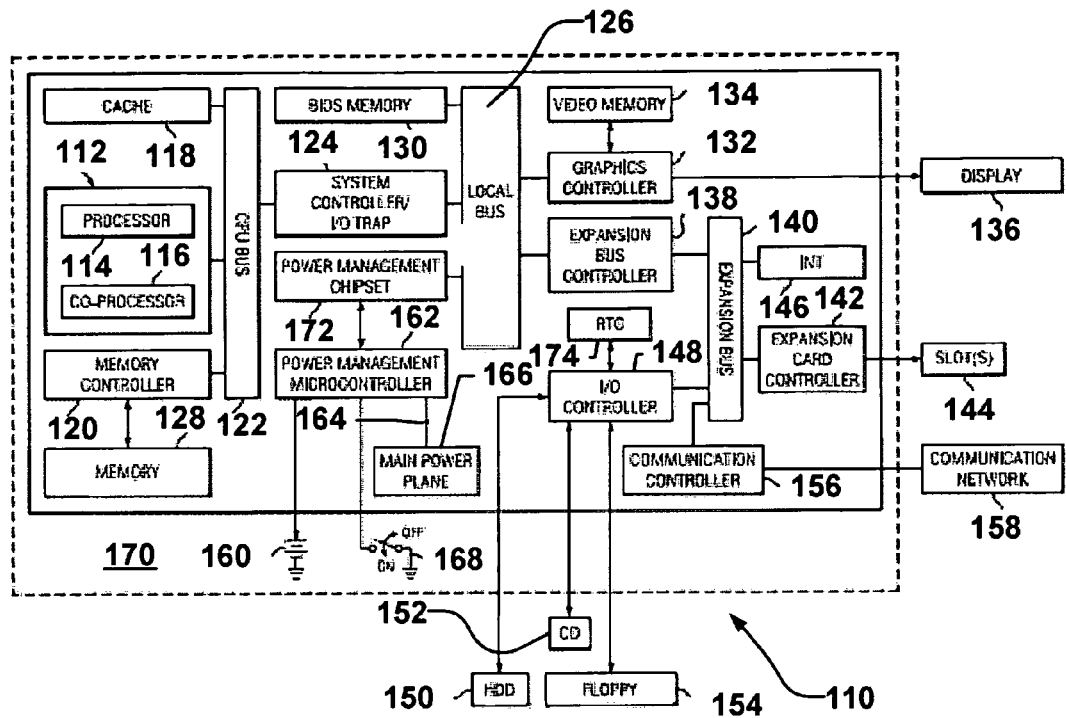
FIG. 1 schematically illustrates a block diagram showing an information handling system, according to teachings of the present disclosure.

Referring first to FIG. 1, a block diagram of an information handling system 110 is shown, according to teachings of the present disclosure. The information handling system 110 or the computer system 110 preferably may include at least one microprocessor or central processing unit (CPU) 112. The CPU 112 may include a processor 114 for handling integer operations and a co-processor 116 for handling floating point operations. The CPU 112 may preferably be coupled to a cache 118 and a memory controller 120 via a CPU bus 122. A system controller input/output (I/O) trap 124 preferably may couple the CPU bus 122 to a local bus 126 and may be generally characterized as part of a system controller.

A main memory 128 of dynamic random access memory (DRAM) modules may preferably be coupled to the CPU bus 122 by the memory controller 120. The main memory 128 may be divided into one or more areas such as a system management mode (SMM) memory area (not expressly shown).

A basic input/output system (BIOS) memory 130 may also preferably be coupled to the local bus 126. A FLASH memory or other nonvolatile memory may be used as the BIOS memory 130. A BIOS program (not expressly shown) may typically be stored in the BIOS memory 130. The BIOS program preferably may include software that facilitates interaction with and between the information handling system 110 devices such as a keyboard (not expressly shown), a mouse (not expressly shown), and/or one or more I/O devices. The BIOS memory 130 may also store system code (note expressly shown) operable to control a plurality of basic information handling system 110 operations.

A graphics controller 132 may preferably be coupled to the local bus 126 and to a video memory 134. The video memory 134 may preferably be operable to store information to be displayed on one or more display panels 136. The display panel 136 may be an active matrix or passive matrix liquid crystal display (LCD), a cathode ray tube (CRT) display, and/or another display technology. In selected applications, uses and/or instances, the graphics controller 132 may also be coupled to an integrated display, such as in a portable information handling system implementation.

A bus interface controller or expansion bus controller 138 may preferably couple the local bus 126 to an expansion bus 140. In various illustrative embodiments, the expansion bus 140 may be configured as an industry standard architecture (ISA) bus. Other buses, for example, a peripheral component interconnect (PCI) bus, may also be used.

In certain information handling system 110 embodiments, an expansion card controller 142 may also be included and may preferably be coupled to the expansion bus 140 as shown in FIG. 1. The expansion card controller 142 may preferably be coupled to a plurality of information handling system 110 expansion slots 144. The expansion slots 144 may be configured to receive one or more computer components (not expressly shown) such as an expansion card (e.g., modems, fax cards, communications cards, and/or other I/O devices).

An interrupt request generator 146 may also preferably be coupled to the expansion bus 140. The interrupt request generator 146 may preferably be operable to issue an interrupt service request over a predetermined interrupt request line in response to receipt of a request to issue an interrupt instruction from the CPU 112.

An I/O controller 148, often referred to as a super I/O controller 148, may also preferably be coupled to the expansion bus 140. The I/O controller 148 may preferably interface to an integrated drive electronics (IDE) hard drive device (HDD) 150, a compact disk-read only memory (CD-ROM) drive 152, and/or a floppy disk drive (FDD) 154. Other disk drive devices (not expressly shown) that may be interfaced to the I/O controller 148 include a removable hard drive, a zip drive, a CD-RW (compact disk-read/write) drive, and a CD-DVD (compact disk—digital versatile disk) drive.

A communication controller 156 may preferably be provided and may enable the information handling system 110 to communicate with a communication network 158, for example, an Ethernet network. The communication network 158 may include a local area network (LAN), a wide area network (WAN), the Internet, an Intranet, wireless broadband, and the like. The communication controller 156 may be employed to form a network interface for communicating with other information handling systems (not expressly shown) coupled to the communication network 158.

As shown in FIG. 1, the information handling system 110 may preferably include a power supply 160, which may provide power to the many components and/or devices that form the information handling system 110. The power supply 160 may be a rechargeable battery, such as a nickel metal hydride (NiMH) or a lithium ion battery, when the information handling system 110 is embodied as a portable or notebook computer, an A/C (alternating current) power source, an uninterruptible power supply (UPS) or other power source.

The power supply 160 may preferably be coupled to a power management microcontroller 162. The power management microcontroller 162 may preferably control the distribution of power from the power supply 160. More specifically, the power management microcontroller 162 may preferably include a power output 164 coupled to a main power plane 166 that may supply power to the CPU 112 as well as to other information handling system 110 components. The power management microcontroller 162 may also be coupled to a power plane (not expressly shown) operable to supply power to an integrated panel display (not expressly shown), as well as to additional power delivery planes that preferably may be included in the information handling system 110.

The power management microcontroller 162 may preferably monitor a charge level of an attached battery and/or a UPS to determine when and when not to charge the battery or the UPS. The power management microcontroller 162 may preferably also be coupled to a main power switch 168, which the user may actuate to turn the information handling system 110 on and off. While the power management microcontroller 162 may power down one or more portions or components of the information handling system 110, for example, the CPU 112, the display 136, and/or the HDD 150, and the like, when not in use to conserve power, the power management microcontroller 162 itself may preferably be substantially always coupled to a source of power, preferably the power supply 160.

A computer system, a type of information handling system 110, may also include a power management chip set 172. The power management chip set 172 may preferably be coupled to the CPU 112 via the local bus 126 so that the power management chip set 172 may receive power management and control commands from the CPU 112. The power management chip set 172 may preferably be connected to a plurality of individual power planes operable to supply power to respective components of the information handling system 110, for example, the HDD 150, the FDD 154, and the like. In this manner, the power management chip set 172 may preferably act under the direction of the CPU 112 to control the power supplied to the various power planes and components of a system.

A real-time clock (RTC) 174 may also be coupled to the I/O controller 148 and the power management chip set 172. Inclusion of the real-time clock (RTC) 174 may permit timed events and/or alarms to be transmitted to the power management chip set 172. The real-time clock (RTC) 174 may be programmed to generate an alarm signal at a predetermined time as well as to perform other operations.

The information handling system 110 may be associated with a chassis 170. Generally, the chassis 170 may be referred to as the computer case and/or case that encloses the some of the components within the information handling system 110. However, other components such as the CD drive 152, the floppy drive 154 and/or the HDD 150, may be placed internal to the chassis 170 and/or separately from the chassis 170 in a stand-alone enclosure (described below in more detail) and/or connected in series.

Figure 2:
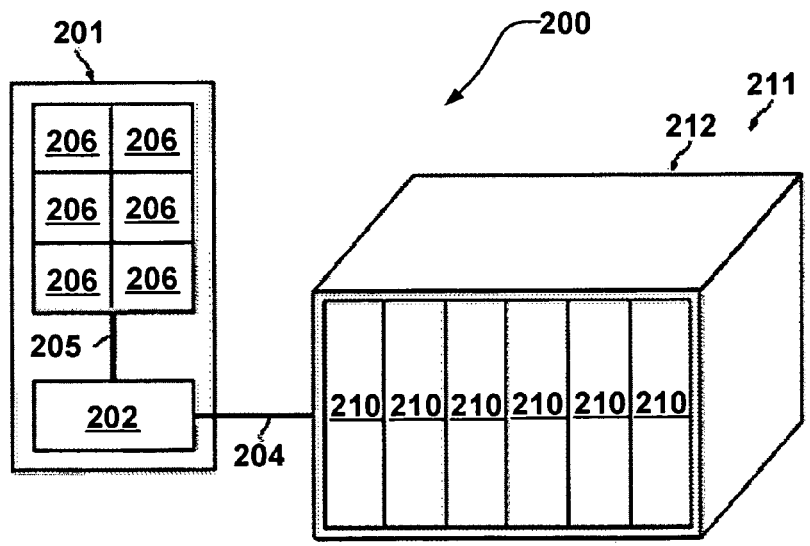
FIG. 2 schematically illustrates a block diagram showing an exemplary embodiment of a storage system including a controller mounted on an internal backplane having hard disk drives (HDD) and a stand-alone enclosure coupled to the controller having additional HDD connected via a SCSI bus, according to teachings of the present disclosure.
Figure 3:
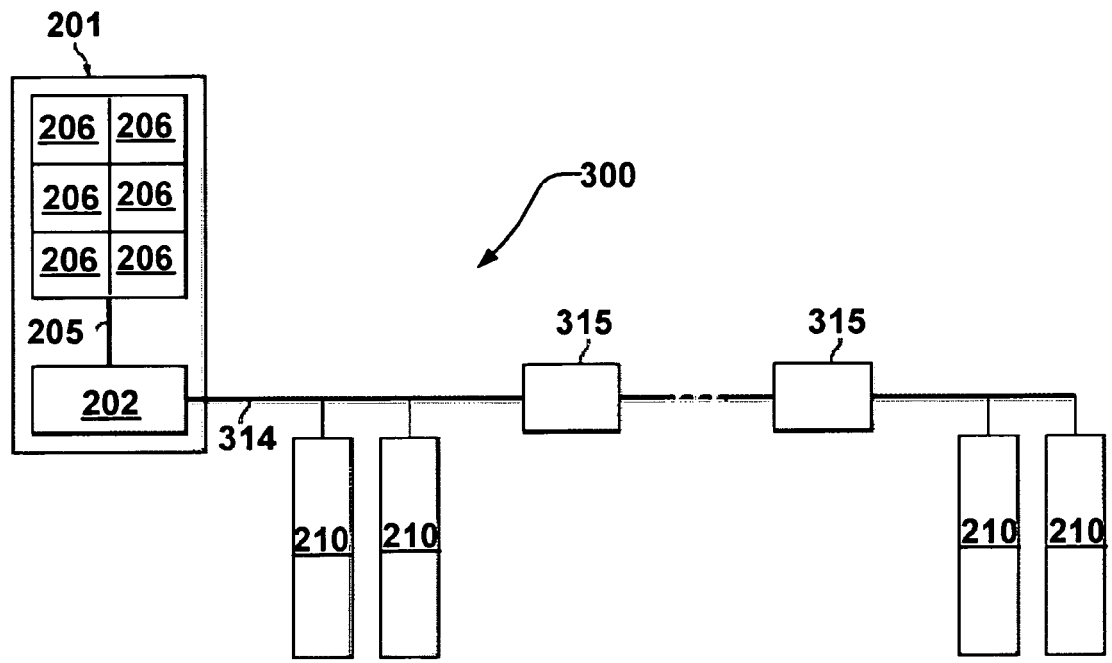
FIG. 3 schematically illustrates a block diagram showing an exemplary embodiment of a storage system including a controller mounted on an internal backplane having hardware devices such as HDD connected via a point-to-point link, according to teachings of the present disclosure.

As shown in FIGS. 2 and 3, for example, one or more computer components may be communicatively connected to the information handling system 110 via a bus 204, as described below in more detail, or through a point-to-point link 314. In some embodiments, the information handling system 110 may include a storage system 200 (described below in more detail) that uses a small computer system interface (SCSI), fiber channel (FC), serial attached SCSI (SAS), and/or other standard for communications between components and/or devices and the system.

FIGS. 2 and 3 are block diagrams showing various exemplary embodiments of the storage system 200, including a small computer system interface (SCSI) storage subsystem 211 and a serial attached SCSI (SAS) and/or a fiber channel (FC) storage subsystem 300, respectively. Each storage subsystem 200 may include a controller 202 mounted on an internal backplane 201 having hard disk drives (HDDs) 206. The SCSI storage subsystem 211 may further include a stand-alone enclosure 212 that may include input/output (I/O) expanders coupled to a controller 202 having additional SCSI devices such as the HDDs 210 connected via a SCSI bus 204. The SAS/FC storage subsystem 300 may further include additional SCSI devices such as the HDDs 210 interconnected via the point-to-point SAS/FC link 314. In various illustrative embodiments, the SAS/FC storage subsystem 300 may further include one or more SCSI expanders 315 that may be operable to regenerate, reshape, and/or retransmit a SCSI signal to additional SCSI devices such as the HDDs 210 interconnected via the point-to-point SAS/FC link 314.

A SCSI/SAS/FC storage system such as storage system 200 may include a plurality of hardware and/or SCSI/SAS/FC devices such as the internal hard disk drives (HDDs) 206 and the external hard disk drives (HDDs) 210 that are connected via I/O expanders. Other examples of SCSI/SAS/FC devices may include tape drives (not expressly shown) and/or compact disk drives (not expressly shown).

The I/O expanders may allow the SCSI devices to connect to the storage system 200. The I/O expanders may include the SCSI expanders 315 that may include expander chips (not expressly shown), the internal backplane 201 and/or the enclosure 212 that may have connections for the SCSI devices to communicate with the storage system 200 via a SCSI bus such as the internal bus 205 and the external bus 204. Useful exemplary enclosures 212 may include a PowerVault 220 system and/or a PowerVault 210 system manufactured by Dell, Inc. Because the SCSI devices may reside at different locations and/or configurations within the storage system 200, the controller 202 may be used to direct communications to the address associated with each SCSI device.

The SAS/FC storage subsystem 300 may further include one or more SCSI expanders 315 that may be used to link and/or interconnect with one or more hardware devices such as the HDD 210. However, there may not necessarily be one SCSI expander 315 for each hardware device such as the hard disk drive (HDD) 210.

Each hardware and/or SCSI device within the storage system 200 may be represented as a SCSI target. Each SCSI device may include an address for communications between a processor and memory (not expressly shown) in the storage system 200 via an I/O controller such as the controller 202 shown on the internal backplane 201. The controller 202 may direct information between the SCSI devices via the internal bus 205 and/or the external bus 204.

The connections on SCSI devices may be interchangeable such that an internal SCSI device such as the internal HDD 206 may be placed in the enclosure 212, having an I/O expander. Similarly, the external HDD 210 may connect to the internal backplane 201 in lieu of the internal HDD 206.

Even though the SCSI devices may physically connect at the different locations, compatibility issues may arise such as the SCSI device may not be supported. Thus, the controller 202 may perform a scan for devices placed on interconnections such as the bus 204 and the point-to-point link 314 for devices associated with storage system 200 to identify potential compatibility issues. For example, compatibility issues may arise between a combination of the SCSI controller and an SCSI hardware device, the SCSI controller and an attached enclosure, the enclosure and an SCSI device, and the SCSI device and another SCSI device. Furthermore, firmware compatibility issues may arise such as one or more of the devices may not have the most up-to-date revision of the appropriate respective firmware.

Figure 4:
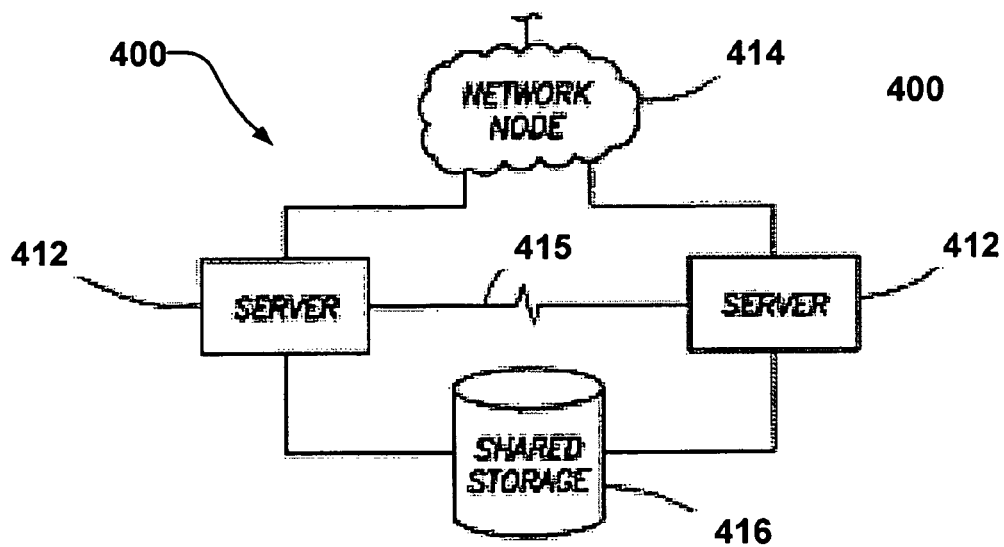
FIG. 4 schematically illustrates a block diagram of a server cluster network.

Shown in FIG. 4 is an exemplary embodiment of a two-node server cluster network 400. The server cluster network 400 may include one or more server nodes 412 that may be interconnected to one another by a heartbeat or communications link 415. Each of the server nodes 412 may be coupled to a network node 414, which represents a connection to a communications network served by the server nodes 412. Each of the server nodes 412 may be coupled to a shared storage unit 416.

Figure 5:
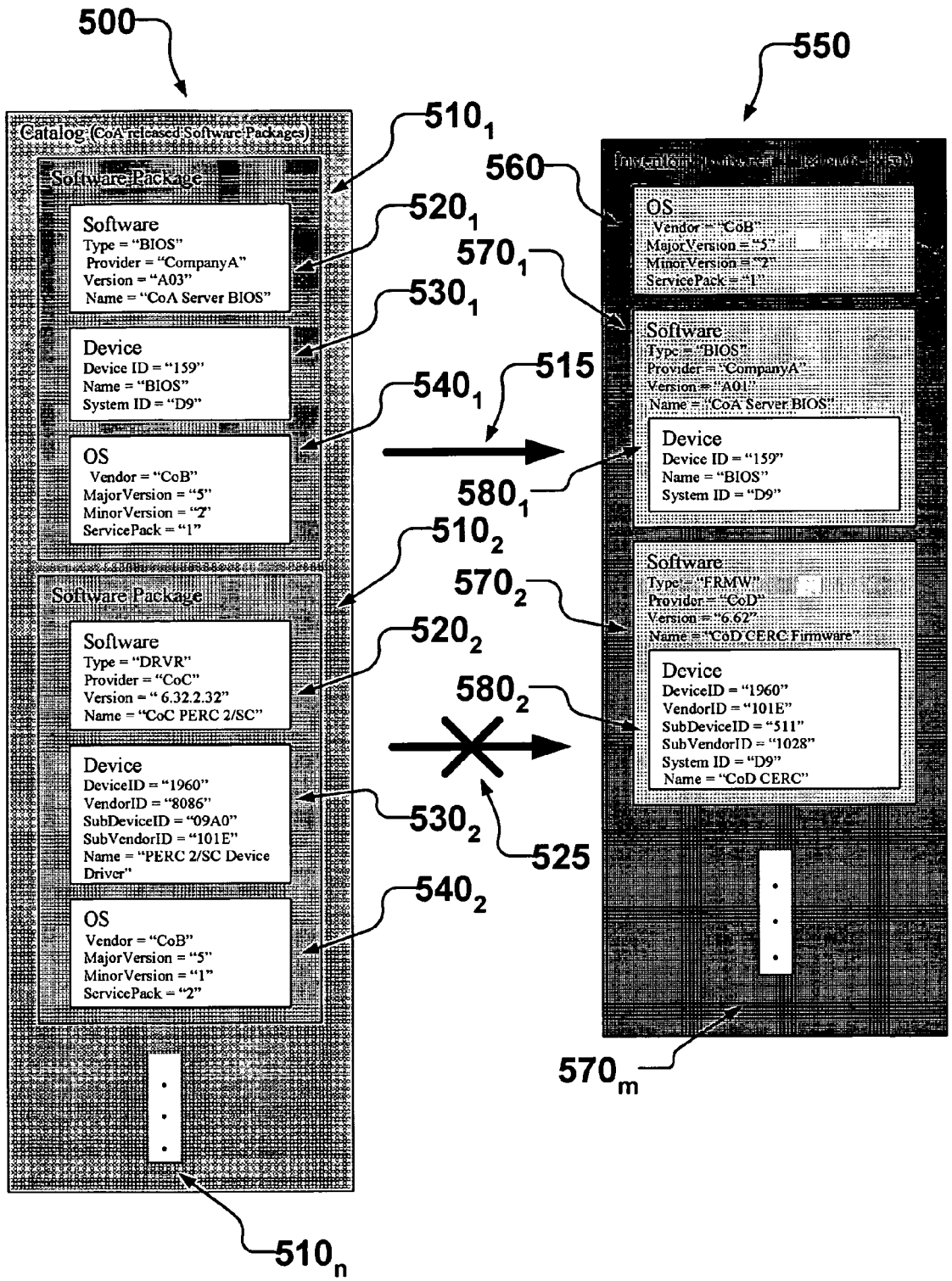
FIG. 5 schematically illustrates an example of the use of various embodiments of a method for updating software in an information handling system.

An example of the use of various embodiments of a method for updating software in an information handling system is schematically illustrated in FIG. 5. A packaging context 500 is shown comprising a catalog comprising metadata for BIOS, firmware, and driver releases of one or more released software packages $510_1, 510_2, \ldots, 510_n$ (indicated schematically), where n may be any finite number. An inventory context 550 is shown comprising an inventory of software installed on at least one server, the inventory context 550 comprising an operating system (OS) inventory 560 and an inventory of one or more instances of software $570_1, 570_2, \ldots, 570_m$ (indicated schematically) is shown, where m may be any finite number. In various illustrative embodiments, the packaging context 500 may show a CompanyA catalog that may be created and posted on the CompanyA website, for example, the packaging context 500 containing all the metadata for the released software packages for BIOS, firmware (FRMW), and/or driver (DRVR) releases. The inventory context 550 may show the inventory information that my be obtained from a CompanyA server, for example. By applying various illustrative embodiments of an update applicability data model described in more detail below, it may be programmatically determined if a particular released software package is applicable to the given server to update certain software on that server.

The released software package $510_1$, comprises software $520_1$, device $530_1$, and operating system (OS) $540_1$, for example. The software $520_1$ may be of a type given by Type="BIOS," may be provided by a provider given by Provider="CompanyA," may be of a version given by Version="A03," and may have a name given by Name="CoA Server BIOS." The device $530_1$ may have a device ID given by DeviceID="159," may have a name given by Name="BIOS," and may have a system ID given by System ID="D9." The operating system (OS) $540_1$ may be from a vendor given by Vendor="CoB," may be of a major version given by MajorVersion="5," may be of a minor version given by MinorVersion="2," and may be in a service pack given by ServicePack="1." Similarly, the released software package $510_2$ comprises software $520_2$, device $530_2$, and operating system (OS) $540_2$, for example. The software $520_2$ may be of a type given by Type="DRVR," may be provided by a provider given by Provider="CoC," may be of a version given by Version="6.32.2.32," and may have a name given by Name="CoC PERC 2/SC." The device $530_2$ may have a device ID given by DeviceID="1960," may have a vendor ID given by VendorID="8086," may have a subdevice ID given by SubDeviceID="09A0," may have a subvendor ID given by SubVendorID="101E," and may have a name given by Name="PERC 2/SC Device Driver." The operating system (OS) $540_1$, may be from a vendor given by Vendor="CoB," may be of a major version given by MajorVersion="5," may be of a minor version given by MinorVersion="1," and may be in a service pack given by ServicePack="2."

The operating system (OS) inventory 560 may indicate that the operating system (OS) is from a vendor given by Vendor="CoB," having a major version given by MajorVersion="5," having a minor version given by MinorVersion="2," and may be in a service pack given by ServicePack="1." The inventory of the instance of software $570_1$ may indicate that the software may be of a type given by Type="BIOS," may be provided by a provider given by Provider="CompanyA," may be of a version given by Version="A01," and may have a name given by Name="CoA Server BIOS," and may run on a device $580_1$ that may have a device ID given by DeviceID="159," may have a name given by Name="BIOS," and may have a system ID given by System ID="D9." The released software package $510_1$ from the packaging context 500 may be applicable to the server inventoried in the inventory context 550, as indicated at 515, since the operating system (OS), the supported system, and the device all match, and the instance of the software in the released software package $510_1$ from the packaging context 500 is a newer and more recent version (A03 instead of A01).

By way of contrast, the inventory of the instance of software $570_2$ may indicate that the software may be of a type given by Type="FRMW," may be provided by a provider given by Provider="CoD," may be of a version given by Version="6.62," and may have a name given by Name="CoD CERC Firmware," and may run on a device $580_2$ that may a device ID given by DeviceID="1960," may have a vendor ID given by VendorID="101E," may have a subdevice ID given by SubDeviceID="511," may have a subvendor ID given by SubVendorID="1028," may have a system ID given by System ID="D9," and may have a name given by Name="CoD CERC." The released software package $510_2$ from the packaging context 500 may not be applicable to the server inventoried in the inventory context 550, as indicated at 525, since no matching device is found (assuming all the other instances of the software $570_3, \ldots, 570_m$ (indicated schematically) also do not have a matching device).

Figure 6:
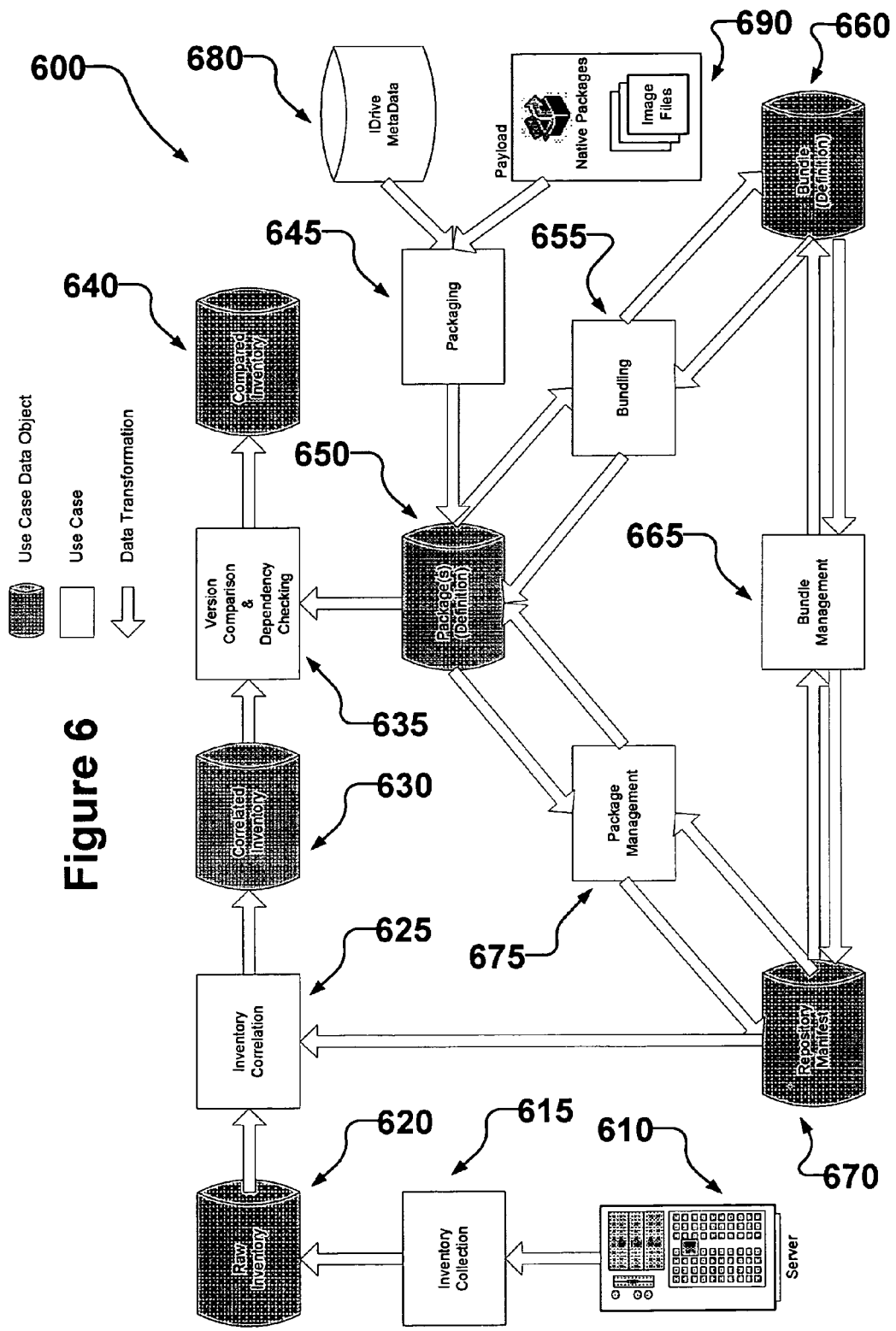
FIG. 6 schematically illustrates a system that may be used with various embodiments of a method for updating software in an information handling system.

FIG. 6 schematically illustrates a system 600 that may be used with various methods for updating software in an information handling system. The system 600 may include at least one server 610, a raw inventory data object 620, a correlated inventory data object 630, a compared inventory data object 640, a package(s) definition data object 650, a bundle definition data object 660, a repository manifest data object 670, at least one IDrive with MetaData 680, and at least one software update package 690 having a payload and at least one image file. Data flow and/or transformation within the system 600 may include inventory collection 615 from the at least one server 610 into the raw inventory data object 620, inventory correlation 625 from the raw inventory data object 620 and the repository manifest data object 670 into the correlated inventory data object 630, and version comparison and/or dependency checking 635 from the correlated inventory data object 630 and the package(s) definition data object 650 into the compared inventory data object 640. Further data flow and/or transformation in the system 600 may include packaging 645 from the at least one IDrive with MetaData 680 and the at least one software update package 690 into the package(s) definition data object 650. Bidirectional data flows and/or transformations in the system may include bundling 655 between the package(s) definition data object 650 and the bundle definition data object 660, bundle management 665 between the bundle definition data object 660 and the repository manifest data object 670, and package management 675 between the repository manifest data object 670 and the package(s) definition data object 650.

Regarding inventory collection, the inventory collection process involves collecting native system data. The inventory data output by the inventory collection process should be represented in a standardized fashion. Therefore, a raw inventory data representation may be required to specify the standardization of the native system data, such as Dell's standardization of the native system data. Such a data representation may enable Dell's SSM solutions, for example, and any other Change Management solution in a hardware-independent way. This data representation needs to cover enough data contents and relationships so that the data representation could be consumed by the upper level SSM applications to perform other Change Management functions, such as Inventory Correlation and/or Version Comparison.

The raw inventory data needs to cover the following information: hardware devices, platform, version of software associated with hardware devices on the system, version of applications, version of patch software, and operating system (OS). The raw inventory could be potentially, but may not be limited to be, collected directly from discovery operations on the system's hardware and operating system (OS), or transformed from one or more intermediate ($3^{rd}$-party) inventory data source and/or data sources.

Regarding inventory correlation, the raw inventory information represents what can be discovered natively from a particular system. The device/software discovered programmatically may or may not align with a corresponding software update package, such as a corresponding CompanyA update package (COAUP). Therefore, it may not be sufficient to perform a comparison with software update packages, such as CompanyA update packages (COAUPs), both manually and programmatically. Additional information may be needed to reflect the mapping between single software components and the grouping of the software components. The correlated inventory will cover the following additional information to enable comparison with CompanyA update packages (COAUPs): device/software grouping aligned with a software update package, such as a corresponding CompanyA update package (COAUP), and device/software version mapping aligned with a software update package, such as a corresponding CompanyA update package (COAUP). The correlated inventory representation also should have information so that the correlated inventory representation may be transformed back to the raw inventory representation.

Regarding version comparison, a version comparison is normally performed between what is on a system with a reference to the user's choice and/or choices. The reference could be package(s), bundle(s) or everything available in a particular repository. The result of a version comparison is one of the important decision-making factors during the SSM planning process. The result of a version comparison enables a user to make conscious decisions regarding what to update. The version comparison data representation should contain the following information in addition to the information covered by the correlated inventory: association between device/software with reference packages, and corresponding package version and location.

Regarding dependency checking, dependency checking may be a process to validate if the version of the package software has any functional dependencies to the software instance on the system. The output of this dependency checking operation may be input to the compared inventory. This process of dependency checking requires dependency information of the package software. This operation dependency checking may be performed on a per package basis.

Regarding packaging, the CompanyA update package (COAUP) is a packaging mechanism used by CompanyA to release system software, for example. The package definition file (package.xml) inside each CompanyA Update Package may be the package data representation. This data representation should contain the following information: identification, applicability—hardware or software (part of the identification), functional dependency on other software, runtime dependency (needed for installation), classification, installation, description, release information, and payload information. The package data representation captured in the package definition file should have a clear association with the inventory representation in order to allow comparisons.

Regarding bundling, a bundle can be viewed as another manifestation of CompanyA update packages (COAUPs). A bundle is a collection of CompanyA update packages (COAUPs) that has a unique use case associated with it. For example, a platform bundle is a collection of CompanyA update packages (COAUPs) that are applicable to a specific CompanyA server platform, an operating system (OS) bundle is a collection of CompanyA update packages (COAUPs) that are applicable to a specific operating system (OS) environment, and a custom bundle is a collection of CompanyA update packages (COAUPs) that represent a specific baseline configuration in the customer's environment. Bundles may be used as comparison references. The bundle data representation should capture enough data and relationships to support version comparison.

Regarding a repository, a package repository is a location where packages and bundles reside for consumption. A package repository could be one of the following: CompanyA Online, subscription CD, local file system, network file share, and custom and/or customer defined. A repository manifest may be needed to represent what is available from the repository to support package management functionalities such as searching, sorting, and/or categorizing. The repository manifest may also need to support runtime functions such as version comparison and/or package download. The repository manifest is the data representation of the repository to provide location transparency.

Figure 7:
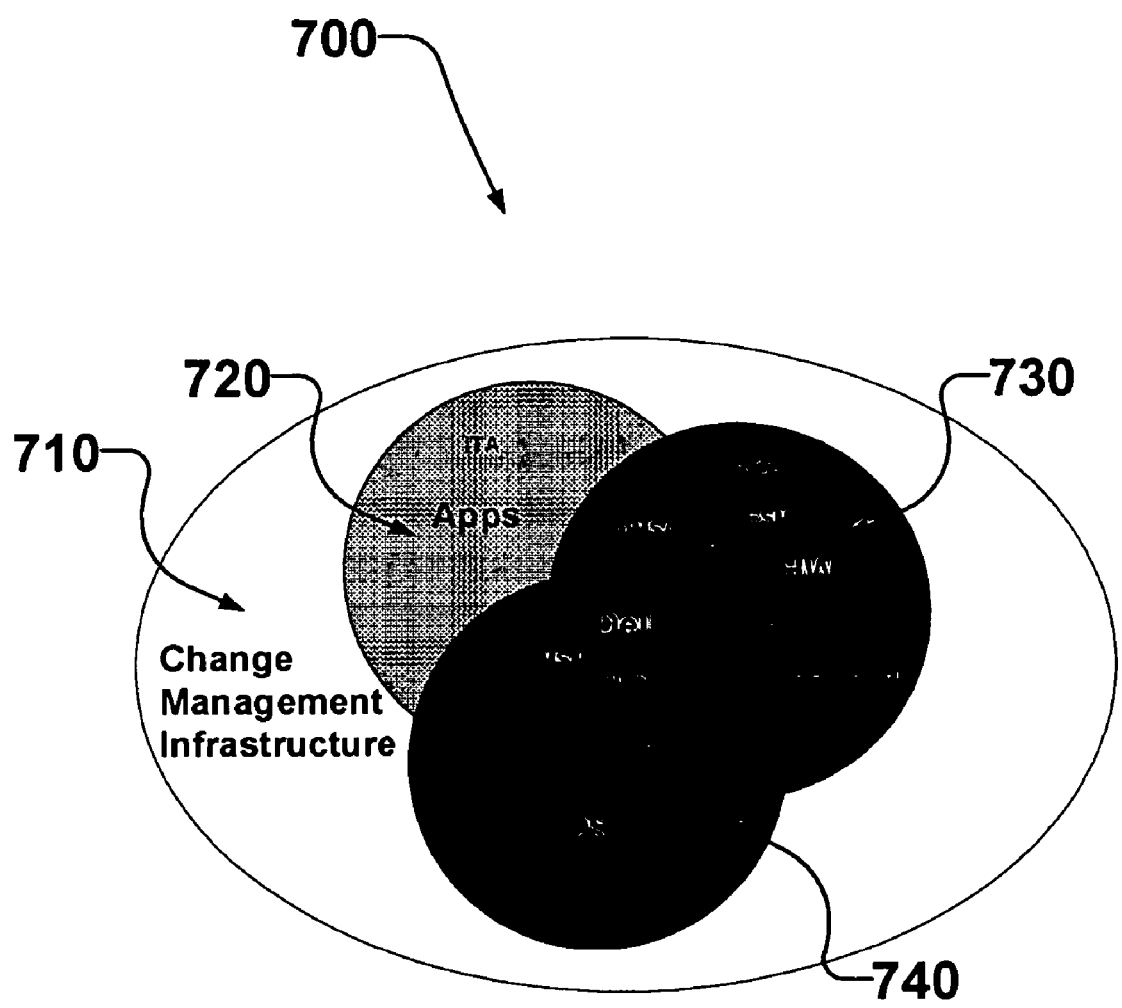
FIG. 7 schematically illustrates a change management universe.

FIG. 7 schematically illustrates a change management universe 700. The change management universe 700 has a change management infrastructure 710 within which applications 720, hardware (HW) 730, and operating systems (OS's) 740 may intersect and overlap to varying degrees. For example, the hardware (HW) 730 may have BIOS, Dell's Embedded System Management (ESM), PERC ROMB and/ or firmware (FW) operating outside of the applications 720 and/or the operating systems (OS's) 740. Similarly, the operating systems (OS's) 740 may have Cluster FS and/or network interface card (NIC) Teaming operating outside of the hardware (HW) 730 and/or the applications 720, for example. Likewise, the applications 720 may have Dell's IT Assistant (ITA) operating outside the hardware (HW) 730 and the operating systems (OS's) 740, for example. Dell's OpenManage Server Administrator (OMSA) may operate within the intersection of the hardware (HW) 730 and the applications 720, for example. Dell's OpenManage Storage Management (OMSM) may operate at least partially within the intersection of the hardware (HW) 730, the applications 720, and the operating systems (OS's) 740, for example. PERC drivers may operate within the intersection of the hardware (HW) 730 and the operating systems (OS's) 740, for example.

Regarding the data model, the following design approach has been adopted. In order to support data representations for all the use cases identified above, various illustrative embodiments of a core data model have been developed. These various illustrative embodiments of the core data model may define the data objects and relationships that are common to all use case data representation. These objects and relationships may be represented in different forms in different contexts. The use cases defined above are different contexts that have specific operations associated therewith. These operations may change over time driven by customer experience, business needs, and/or product strategy, for example. These changes derived from different operations may create different contexts. An important objective of the various illustrative embodiments of the core data model is to reveal the intrinsic data objects and relationships in the change management universe 700, as shown in FIG. 7, such as the CompanyA Change Management space, for example. These data objects and relationships should be independent of the contexts and operations from different needs at different times. The various illustrative embodiments of the basic data model may be applied in different contexts to support different operations. As described in more detail below, the various illustrative embodiments of the basic data model may stay substantially the same as the contexts, operations as well as the representations changes.

Regarding the change management universe 700, as described above, an important objective of the various illustrative embodiments of the core data model is to reveal the intrinsic data objects and relationships in the change management universe 700, as shown in FIG. 7, such as the CompanyA Change Management space, for example. The various illustrative embodiments of the core data model should also cover the change management universe 700, as shown in FIG. 7, such as the CompanyA Change Management space, for example. The change management problems existing in the change management universe 700 and/or the CompanyA Change Management space, for example, usually manifest themselves in the two different contexts of inventory and packaging.

The inventory context refers to the comprehensive list of hardware and software discovered on a specific box, for example. The inventory context includes all different hardware devices and software components installed and running on the box. Inventory data may exist and represent different level of information at different stages of the Change Management Process. These levels of information have been derived from the use case study. Each level of inventory may bring additional data object instance(s) and/or relationship(s) into the data representation. The following are the three levels of inventory representations that have been identified through the use case study: Raw Inventory—representing the empirical system data that could be discovered natively from the system, the raw inventory may include, but not be limited to hardware, software and operating system (OS); Correlated Inventory—representing the raw inventory with added information due to packaging preferences in order to be aligned with the information presented from the packaging context; and Compared Inventory—representing the correlated inventory with added relationship(s) due to comparing with a package.

The packaging context refers to the mechanism to wrap released software. The packaging context includes CompanyA update packages (COAUPs), for example, and other native packages. The package manifest refers to the metadata of the package: Package Manifest—representing packaging information. This information should have a clear correlation with what is represented in the inventory context in order to make any association. The various illustrative embodiments of the core data model should represent all the intrinsic data objects and relationships presented in all the above contexts.

Figure 8:
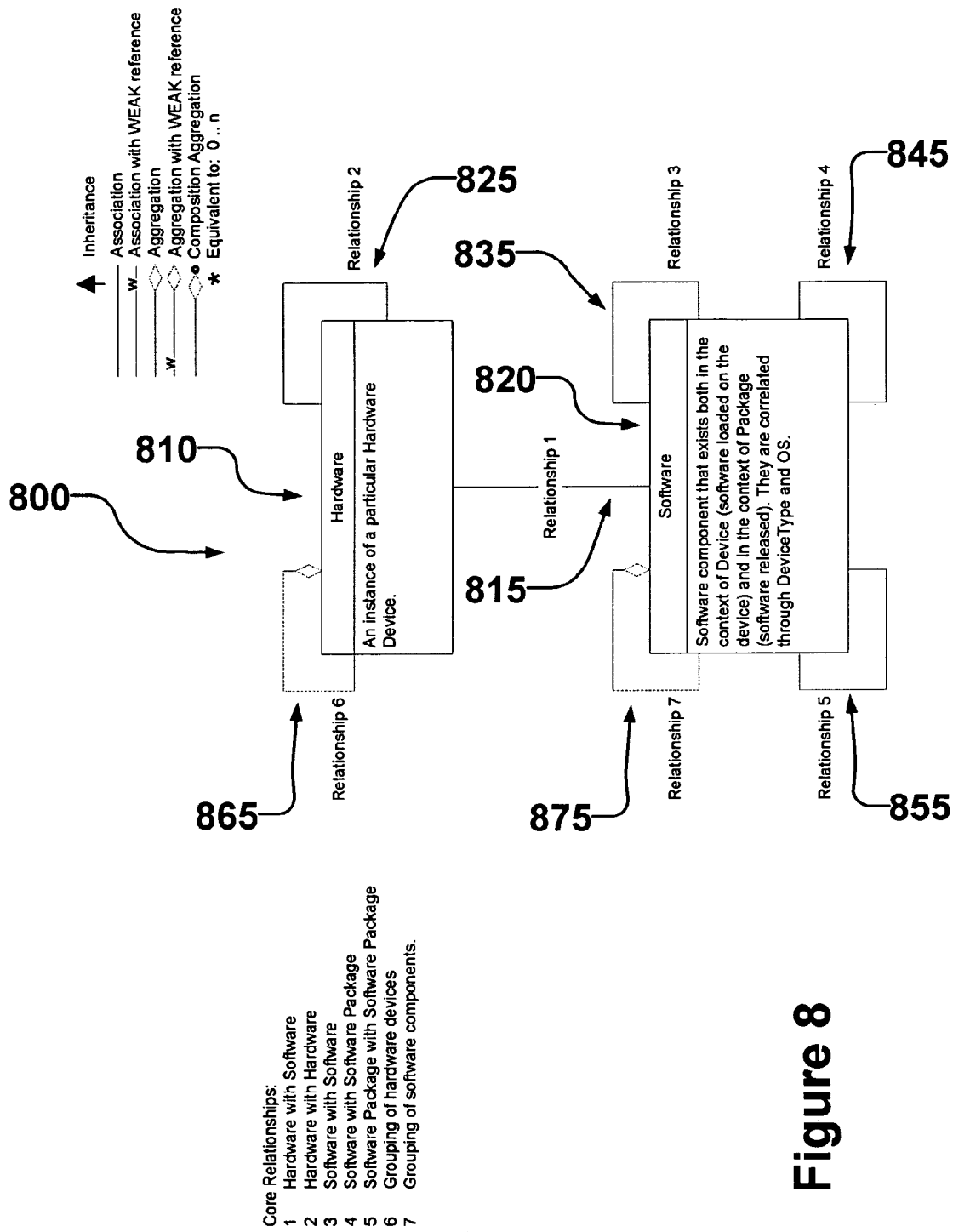
FIG. 8 schematically illustrates a conceptual unified modeling language (UML) representation illustrating the plurality of relationships in various illustrative embodiments of an update applicability data model according to teachings of the present disclosure.

FIG. 8 schematically illustrates a conceptual unified modeling language (UML) representation 800 illustrating the plurality of relationships in various illustrative embodiments of an update applicability data model according to teachings of the present disclosure. The UML representation 800 shows a hardware class 810 and a software class 820. The hardware class 810 may have the attribute of an instance of a particular hardware device. The software class 820 may have the attribute of a software component that exists both in the context of a device (software loaded on the device) and in the context of a package (software released), with each software components being correlated through DeviceType and operating system (OS). The UML representation 800 also shows seven core relationships: (1) a hardware with software relationship 1, as indicated by an association 815 between the hardware class 810 and the software class 820; (2) a hardware with hardware relationship 2, as indicated by an association 825 between the hardware class 810 and the hardware class 810 itself; (3) a software with software relationship 3, as indicated by an association 835 between the software class 820 and the software class 820 itself; (4) a software with software package relationship 4, as indicated by an association 845 between the software class 820 and the software class 820 itself; (5) a software package with software package relationship 5, as indicated by an association 855 between the software class 820 and the software class 820 itself; (6) a grouping of hardware devices, as indicated by an aggregation 865 between the hardware class 810 and the hardware class 810 itself; and (7) a grouping of software components, as indicated by an aggregation 875 between the hardware class 820 and the hardware class 820 itself.

Regarding various illustrative embodiments of the conceptual model, various illustrative embodiments of the conceptual model are described representing the abstract data objects and relationships presented in the use cases from change management universe 700 and related contexts. Regarding the abstract objects and relationships, by observing the use cases from the change management universe 700, it has been have found that important intrinsic objects that are interesting may be represented in Device and Software regardless of the context. The relationships between Device and Software may be summarized into the following in two different contexts—inventory and packaging: (1) correlation between a hardware device and its associated software components in the inventory context (Hardware with Software), with this relationship addressing what software is loaded for what hardware and to what hardware the software is applicable; (2) comparison between hardware devices in the inventory context (Hardware with Hardware), this relationship addressing if the two hardware instances are same type or different type; (3) comparison between software components in the inventory context (Software with Software), this relationship addressing if the two software instances have the same applicability; (4) comparison between software component in the inventory context and software component in the packaging context (Software with Software Package), this relationship addressing which package could be applied to what hardware in the system and what the revision differences are, this relationship being established to compare the same software entity from different contexts; (5) comparison between software components in the packaging context (Software Package with Software Package), this relationship addressing whether the two packages are different revisions of the same software or completely different software, this relationship being established to compare the same entity in the packaging context; (6) grouping of hardware devices in the inventory context, this relationship being introduced by aligning with a packaging preference; and (7) grouping of software components in both contexts, this relationship being introduced by aligning with a packaging preference.

Figure 9:
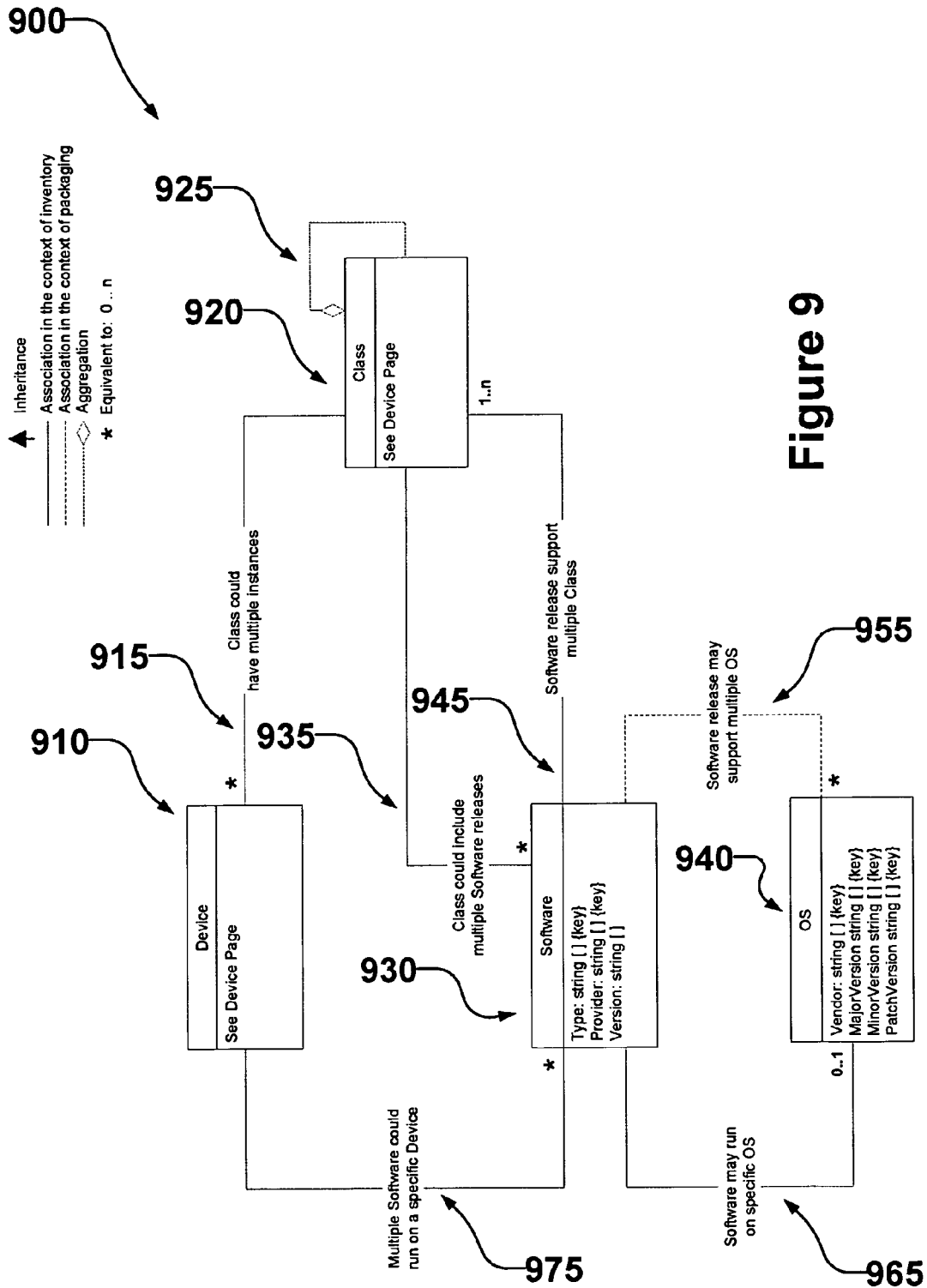
FIG. 9 schematically illustrates an example of the UML representation illustrating various illustrative embodiments of an update applicability data model according to teachings of the present disclosure.

FIG. 9 schematically illustrates an example of a unified modeling language (UML) representation illustrating various illustrative embodiments of an update applicability data model 900 according to teachings of the present disclosure. The UML representation of the update applicability data model 900 shows a device class 910, a class of classes 920, a software class 930, and an operating system (OS) class 940. The device class 910 may have the attribute that the device represents an instance of specific applicability. The class of classes 920 may have the attribute that the class represents applicability of one or more software components. The device class 910 and the class of classes 920 may both have inherited attributes, as shown and described below with reference to FIG. 10. The software class 930 may have the attributes of Type: string [ ]{key}, Provider: string [ ]{key}, and Version: string [ ]. The operating system (OS) class 940 may have the attributes of Vendor: string [ ]{key}, MajorVersion: string [ ]{key}, MinorVersion: string [ ]{key}, and PatchVersion: string [ ]{key}. The UML representation of the update applicability data model 900 also shows six associations and one aggregation: (1) a class with device association in an inventory context, as indicated by an association 915 between the device class 910 and the class of classes 920, where class may have multiple instances labeled 0, 1, 2, . . . , n, where n is any finite number; (2) a class with class aggregation, as indicated by an aggregation 925 between the class of classes 920 with the class of classes 920 itself; (3) a class with software association in a packaging context, as indicated by an association 935 between the class of classes 920 and the software class 930, where the class may include multiple software releases labeled 0, 1, 2, . . . , n, where n is any finite number, and one or more of the software releases may be applicable to other software; (4) a software with class association in a packaging context, as indicated by an association 945 between the software class 930 and the class of classes 920, where the software release may support, and be applicable to, multiple classes labeled 1, 2, . . . , n, where n is any finite number; (5) a software with operating system (OS) association in a packaging context, as indicated by an association 955 between the software class 930 and the operating system (OS) class 940, where the software release may support, and be applicable to, multiple operating systems (OS's) labeled 0, 1, 2, . . . , n, where n is any finite number; (6) a software with operating system (OS) association in an inventory context, as indicated by an association 965 between the software class 930 and the operating system (OS) class 940, where the software may run on a specific operating system (OS) labeled by 0, 1, in a 1-to-1 relationship; and (7) a software with device association in an inventory context, as indicated by an association 975 between the software class 930 and the device class 910, where the multiple instances of software and/or software components, labeled 0, 1, 2, . . . , n, where n is any finite number, may run on a specific device and/or instance of a device, in a many-to-1 relationship.

Regarding the data model, the various illustrative embodiments of the conceptual model described above may represent the abstract data objects and relationships. The various illustrative embodiments of the core data model may be exemplary instances of the conceptual model, realizing the abstract data objects and relationships with concrete definitions of data objects and relationships. The data objects and relationships defined in various illustrative embodiments of the core data model should be able to represent the intrinsic nature of the change management universe 700, and should be independent of the context that these objects could be in and should be extensible so that new objects and relationships may be added without having any substantial impact to the existing context.

This section of the document will introduce the UML representation of the data model. Then it will walk through the data objects and its properties, and explain what they represent. It will later add relationships into the picture and elaborate how these relationships can fulfill the abstract relationships defined in the conceptual model. And finally it will provide concrete examples of how the core data model be applied to different context.

Figure 10:
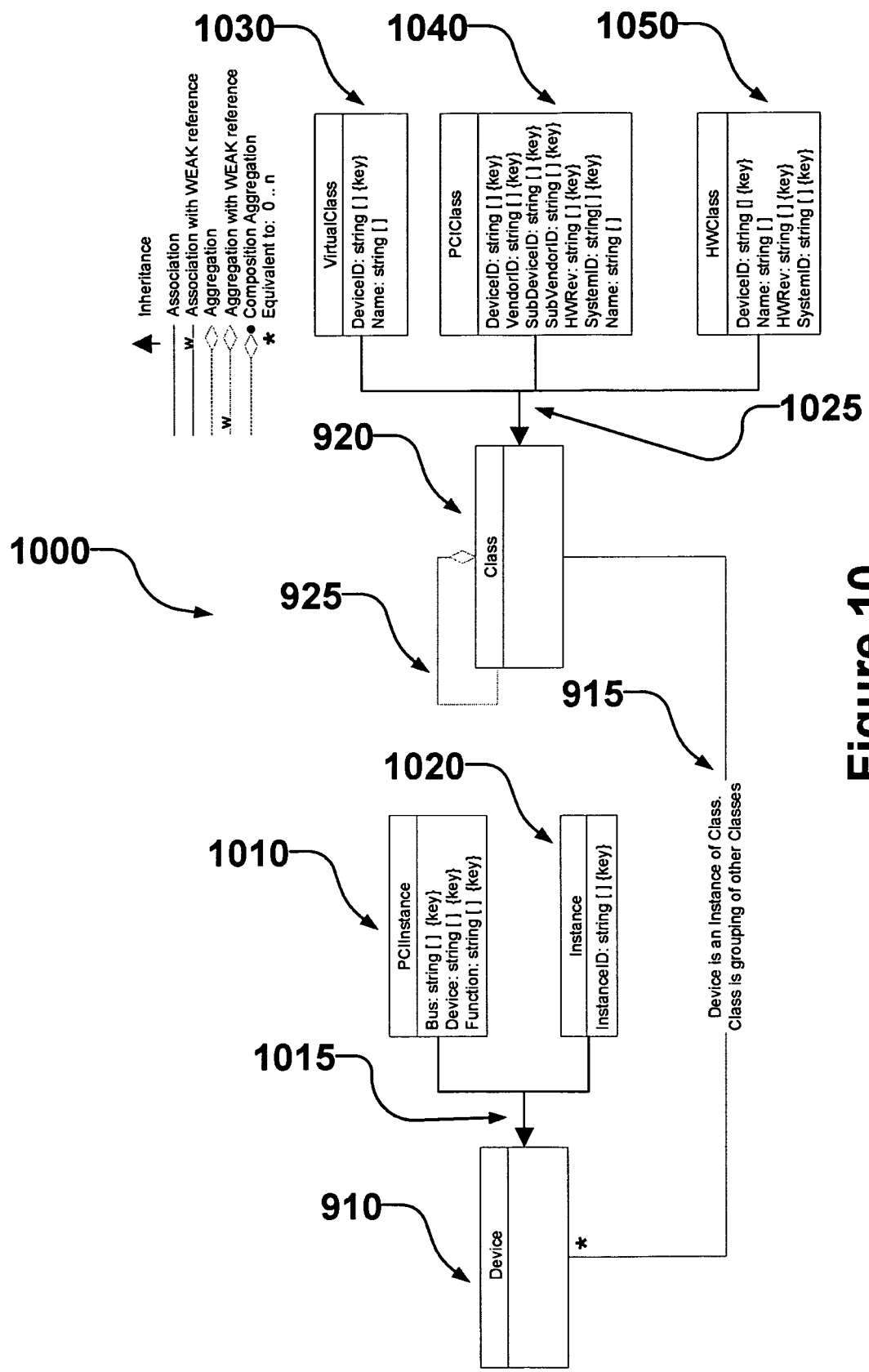
FIG. 10 schematically illustrates an example of the UML representation illustrating a device model specification in various illustrative embodiments of an update applicability data model according to teachings of the present disclosure.

FIG. 10 schematically illustrates an example of the UML representation illustrating a device model specification 1000 in various illustrative embodiments of the update applicability data model 900, as shown in FIG. 9, for example, according to teachings of the present disclosure. The UML representation of the device model specification 1000 shows the device class 910, the class of classes 920, a PCIInstance class 1010, an instance class 1020, a VirtualClass class 1030, a PCIClass class 1040, and an HWClass class 1050. As described above, the device class 910 may have the attribute that the device represents an instance of specific applicability. Also as described above, the class of classes 920 may have the attribute that the class represents applicability of one or more software components. The device class 910 and the class of classes 920 may both have inherited attributes, as shown by inheritance arrows 1015 and 1025, respectively. The device class 910 may have inherited attributes from the PCIInstance class 1010 and the instance class 1020, as shown by the inheritance arrow 1015. The class of classes 920 may have inherited attributes from the VirtualClass class 1030, the PCIClass class 1040, and the HWClass class 1050, as shown by the inheritance arrow 1025. The PCIInstance class 1010 may have the attributes of Bus: string [ ]{key}, Device: string [ ]{key}, and Function: string [ ]{key}. The instance class 1020 may have the attribute of InstanceID: string [ ]{key}. The VirtualClass class 1030 may have the attributes of DeviceID: string [ ]{key} and Name: string [ ]. The PCIClass class 1040 may have the attributes of DeviceID: string [ ]{key}, VendorID: string [ ]{key}, Sub DeviceID: string [ ]{key}, SubVendorID: string [ ]{key}, HWRev: string [ ]{key}, SystemID: string [ ]{key}, and Name: string [ ]. The HWClass class 1050 may have the attributes of DeviceID: string [ ]{key}, Name: string [ ], HWRev: string [ ]{key}, and SystemID: string [ ]{key}. The UML representation of the device model specification 1000 also shows one association and one aggregation: (1) the class with device association in the inventory context, as indicated by the association 915 between the device class 910 and the class of classes 920, where class may have multiple instances labeled 0, 1, 2, . . . , n, where n is any finite number, where device is an instance of class; and (2) the class with class aggregation, as indicated by the aggregation 925 between the class of classes 920 with the class of classes 920 itself, where class is a grouping of other classes.

A further description is given below of the data objects and their properties, and an explanation of what they represent. Relationships are then described further below and how these relationships may fulfill the abstract relationships defined in the various illustrative embodiments of the conceptual model above may be elaborated. Concrete examples of how the various illustrative embodiments of the core data model may be applied to different contexts may then be provided.

Among the Data Objects to be considered are Software, Device, Class, and Operating System (OS). With respect to Software, this data object may represent a software component in general. This object may exist in both the context of inventory (software running on a device) and the context of packages (software released). The Software data object may be used to model any updateable software component. The Software data object may be uniquely identified by its applicability represented by the Class and operating system (OS). The Software data object may have the following attributes:

| Attribute | Description |
| --- | --- |
| Type | Type of the software - DRVR, FRMW, APP, and the like |
| Vendor | Vendor of the software |
| Version | Version of the software |

With respect to Device, this data object may represent an instance of a particular hardware, PCI, and/or virtual device on a particular system. The Device data object may have the following incarnations: (1) PCIInstance uniquely identifies a PCI instance using Bus, Device, and function number; and (2) DeviceInstance uniquely identifies a non-PCI instance using an instance ID. The PCI Instance Object may have the following attributes:

| Attribute | Description |
| --- | --- |
| BUS | Bus number |
| Device | Device number |
| Function | Function number |

The Instance Object may have the following attributes:

| Attribute | Description |
| --- | --- |
| instanceID | Unique ID for the instance |

With respect to Class, this data object may represent a particular type of hardware, PCI device, and the like. The Class data object may also represent a particular type of application in the form of virtual device. Class may be designed as part of the keys to identify hardware and software. Class may represent their applicability. Class may also represent the grouping of other Classes. Software grouping and Device grouping may be represented through Class grouping. The Class data object may be the base object for PCIClass, HWClass, and VirtualClass. PCIClass may represent a specific PCI device type identified by PCI IDs. HWClass may represent a specific non-PCI hardware device type identified by a unique device ID. Multiple instances may be possible for a specific type of hardware device. VirtualClass may represent a specific virtual device type identified by a unique device ID. This may include, but may not be limited to, a virtual device associated by Virtual Device Driver and a virtual device used to identify a software application. The PCI Class Object may have the following attributes:

| Attribute | Description |
| --- | --- |
| DeviceID | DeviceID - Part of PCI IDs |
| VendorID | VendorID - Part of PCI IDs |
| SubDeviceID | SubDeviceID - Part of PCI IDs |
| SubVendorID | SubVendorID - Part of PCI IDs |
| HWRev | Hardware compatibility bits |
| SystemID | System ID if class is system specific |
| Name | Name of the Class |

The HWClass Object may have the following attributes:

| Attribute | Description |
| --- | --- |
| DeviceID | Device or Virtual Device ID |
| HWRev | Hardware compatibility bits |
| SystemID | System ID if class is system specific |
| Name | Name of the Class |

The VirtualClass Object may have the following attributes:

| Attribute | Description |
| --- | --- |
| DeviceID | Unique ID of the virtual class |
| Name | Name of the Class |

With respect to Operating System (OS), this data object represents an Operating System. The object could exist in both the context of inventory (OS loaded) and the context of packages (OS supported). The Operating System (OS) data object is part of the qualifiers for the Software data object and the Operating System (OS) data object has the following attributes:

| Attribute | Description |
| --- | --- |
| Vendor | OS vendor |
| MajorVersion | Major version |
| MinorVersion | Minor version |
| PatchVersion | Patch Version of the OS |

With respect to the core relationships described above, the core relationships may be modeled as following: (1) Hardware with Software—a hardware device and its associated software components may be correlated by keying of the same Class—Class is part of the qualifiers for both Device and Software; (2) Hardware with Hardware—hardware devices may be comparable if associated with the same Class; (3) Software with Software—software components running on different instances of Device may be comparable due to the matching Class of the underlining Device; (4) Software with Software Package—a software component loaded on its corresponding device and a software component packaged for distribution may be comparable by association with the same Class and Operating System (OS)—the software loaded on a specific instance of Device has a specific Class and/or a specific Operating System (OS)—the software package may support certain Classes and Operating Systems (OS's); (5) Software Package with Software Package—different software packages released may be comparable by the same applicability—they may support the same Class and Operating System (OS); (6) Device grouping may be represented through Class grouping; and (7) Software grouping may be represented through Class grouping.

The following examples illustrate how the data objects described above may represent various hardware and software components in the change management universe 700. These data objects and relationships may be represented or expressed in different ways, for example, XML Schema, DB Schema, C++ Class, and the like. The various illustrative embodiments of the data model disclosed herein are designed to be independent of any particular representation and/or expression. The purpose of the following illustrations is to use concrete real example to explain what data objects and relationships are needed and represented using various illustrative embodiments of the basic data model. The examples by no means represent all the objects and relationships in various illustrative embodiments of the basic data model. Some of the core relationships in various illustrative embodiments of the data model only emerge after certain applicable operations. These relationships will be described in more detail below. The following examples below only cover hardware and software in their raw form in both the inventory and packaging context.

Consider first a basic input/output system (BIOS). With respect to the Inventory Context, the Data Objects may include: Class—definition of the hardware device with which BIOS may be associated; Device—the actual instance of the hardware device with which BIOS may be associated; and Software—an instance of BIOS running on the actual instance of the hardware device with which BIOS may be associated. The Relationships may include: Hardware with Software—BIOS Device and BIOS Software may be correlated by associating with the same BIOS hardware definition; Hardware with Hardware—BIOS Device instance may be uniquely identified by its Class and Instance—comparison may be performed between different instances of BIOS Device; and Software with Software—BIOS Software instance may be uniquely associated with its hardware device instance—comparison may be performed between different instances of BIOS software. With respect to the Package Context, the Data Objects may include: Software—BIOS package of specific revision (A04); Class—definition of the hardware device with which BIOS may be associated, which may represent the applicability of the software component; and Device—not applicable in this context since there is no instance of hardware existing in the packaging context. The Relationships may include: Hardware with Software—the BIOS software component in the software package may have its hardware applicability—the applicability may be represented by the definition of the hardware device class.

Consider next an CompanyF PERC Driver. With respect to the Inventory Context, the Data Objects may include: Class—definition of the PCI RAID device; Device—the actual instance of the PCI RAID Device; Software—RAID Driver running to support CompanyF RAID Device; and Operating System (OS)—the Operating System (OS) running. The Relationships may include: Hardware with Software—CompanyF PERC PCI Device and its Device Driver Software may be correlated by having the same CompanyF PCI Class; Hardware with Hardware—CompanyF PERC PCI Device instance may be uniquely identified by its Class Definition and Instance—comparison may be performed between different instances of CompanyF PERC PCI Device; and Software with Software—CompanyF PERC PCI Device instance may be uniquely identified by its PCI Device instance—comparison may be performed between different instances of CompanyF PCI Device Driver—for example, there could be two instances of PERC 3/SC on the system that may have different Firmware on them, 2.8 and 2.7.1, and there may be one driver, 2.7.1, for both instances. With respect to the Package Context, the Data Objects may include: Software—CompanyF RAID Driver package; Class—definition of the PCI RAID Device the driver can support—this may represent the applicability of the driver; Device—not applicable in this context since there is no instance of hardware existing in the packaging context; and Operating System (OS)—applicable Operating System (OS) for the Package. The Relationships may include: Hardware with Software—the RAID Driver in the software package may have its hardware applicability—the applicability may be represented by the definition of the hardware device class.

Regarding Object Properties, the detailed properties of each object in various illustrative embodiments of the data model may be defined as follows. The potential data source for each of the object properties identified may be provided as well. Among the Object Properties to be considered are Software, Device, Operating System (OS) and Class. With respect to Software, the Software object may be used to model any updateable software component that may be uniquely identified by its applicability represented by the Class and Operating System (OS). The Software Object may have the following attributes:

| Attribute | Description |
| --- | --- |
| Type | Type of the software - DRVR, FRMW, APP, and the like |
| Vendor | Vendor of the software |
| Version | Version of the software |

With respect to Device, Device may represent a unique device instance. Device may have the following incarnations: (1) PCIInstance uniquely identifies a PCI instance using Bus, Device and function number; and (2) DeviceInstance uniquely identifies a non-PCI instance using an instance ID. The PCI Instance Object may have the following attributes:

| Attribute | Description |
| --- | --- |
| BUS | Bus number |
| Device | Device number |
| Function | Function number |

The Instance Object may have the following attributes:

| Attribute | Description |
| --- | --- |
| instanceID | Unique ID for the instance. |

With respect to Operating System (OS), Operating System (OS) may represent the Operating System (OS). Operating System (OS) may have the following attributes:

| Attribute | Description |
| --- | --- |
| Vendor | OS vendor |
| majorVersion | Major version |
| minorVersion | Minor version |
| patchVersion | Patch Version of the OS |

With respect to Class, Class may represent various hardware and virtual devices including PCIClass, HWClass, and VirtualClass. PCIClass may represent a specific PCI device type identified by PCI IDs. HWClass may represent a specific non-PCI hardware device type identified by a unique device ID. Multiple instances may be possible for a specific type of hardware device. VirtualClass may represent a specific virtual device type identified by a unique device ID. This may include, but may not be limited to, a virtual device associated by Virtual Device Driver and a virtual device used to identify a software application. The PCI Class Object may have the following attributes:

| Attribute | Description |
| --- | --- |
| DeviceID | DeviceID - Part of PCI IDs |
| VendorID | VendorID - Part of PCI IDs |
| SubDeviceID | SubDeviceID - Part of PCI IDs |
| SubVendorID | Sub VendorID - Part of PCI IDs |
| HWRev | Hardware compatibility bits. |
| SystemID | System ID if class is system specific |
| Name | Name of the Class |

The HWClass Object may have the following attributes:

| Attribute | Description |
| --- | --- |
| DeviceID | Device or Virtual Device ID. |
| HWRev | Hardware compatibility bits. |
| SystemID | System ID if class is system specific |
| Name | Name of the Class |

The VirtualClass Object may have the following attributes:

| Attribute | Description |
| --- | --- |
| DeviceID | Unique ID of the virtual class. |
| Name | Name of the Class. |

Figure 11:
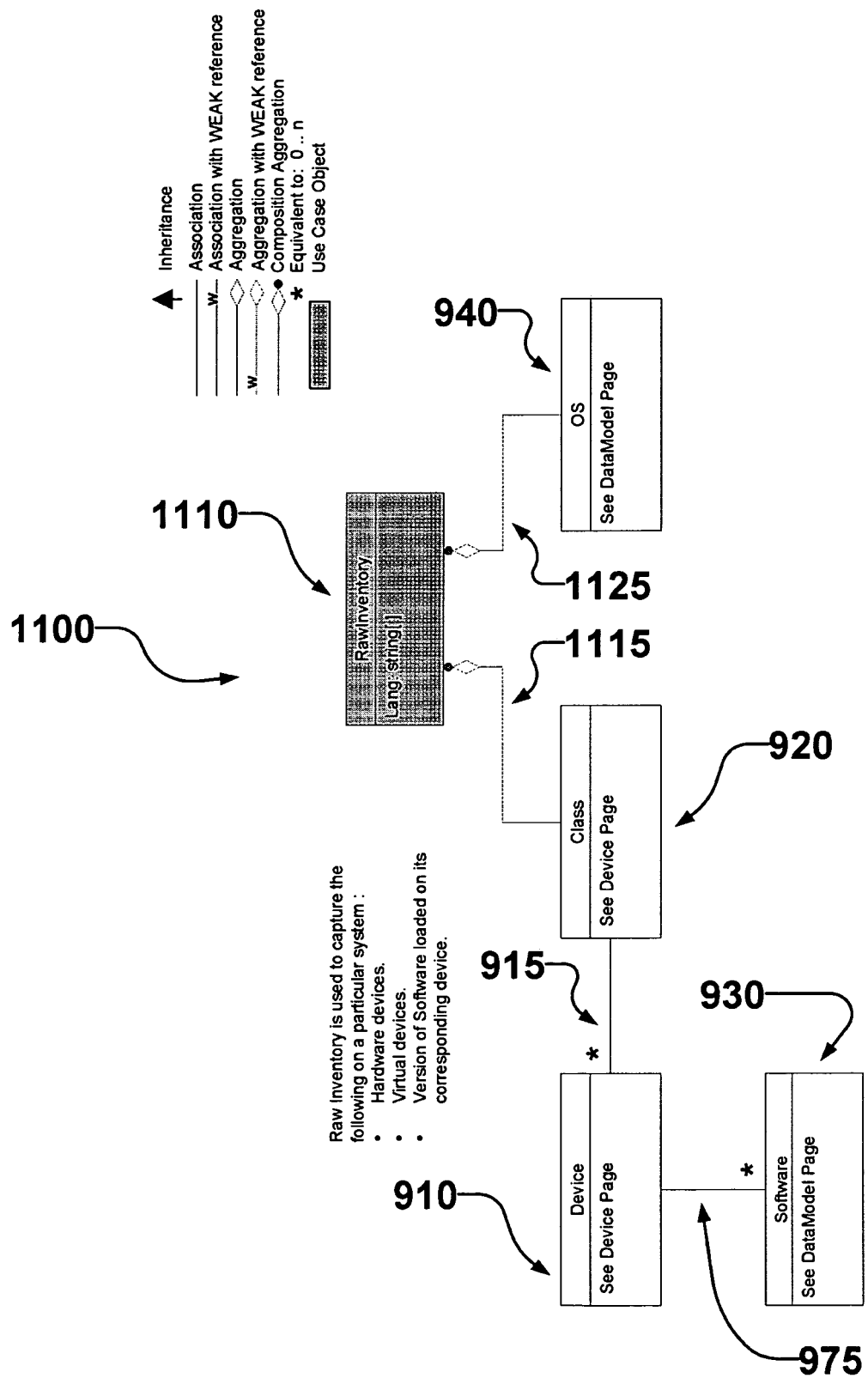
FIG. 11 schematically illustrates an example of the UML representation illustrating a raw inventory model specification in various illustrative embodiments of an update applicability data model according to teachings of the present disclosure.

FIG. 11 schematically illustrates an example of the UML representation illustrating a raw inventory model specification 1100 in various illustrative embodiments of an update applicability data model according to teachings of the present disclosure. The UML representation of the raw inventory model specification 1100 shows a raw inventory class 1110, the device class 910, the class of classes 920, the software class 930, and the operating system (OS) class 940. The raw inventory class 1110 may have the attribute of Lang: string [ ]. The device class 910, the class of classes 920, the software class 930, and the operating system (OS) class 940 may have the attributes as described above, and as shown in FIGS. 9 and 10. The UML representation of the raw inventory model specification 1100 also shows two associations and two composition aggregations: (1) the class with device association in the inventory context, as indicated by the association 915 between the device class 910 and the class of classes 920, where class may have multiple instances labeled 0, 1, 2, . . . , n, where n is any finite number; (2) the software with device association in the inventory context, as indicated by the association 975 between the software class 930 and the device class 910, where the multiple instances of software and/or software components, labeled 0, 1, 2, . . . , n, where n is any finite number, may run on a specific device and/or instance of a device, in a many-to-1 relationship; (3) a class with raw inventory composition aggregation, as indicated by a composition aggregation 1115 between the class of classes 920 with the raw inventory class 1110; and (4) an operating system (OS) with raw inventory composition aggregation, as indicated by a composition aggregation 1125 between the operating system (OS) class 940 with the raw inventory class 1110. The raw inventory given by the raw inventory model specification 1100 may be used to capture the following on a particular system: (a) hardware devices, (b) virtual devices, and (c) the version of software loaded on the device corresponding to the software.

With respect to various illustrative embodiments of data model application, a description may be given of examples of how various illustrative embodiments of the basic data model may be applied to the various use cases identified above. These use case data models specified herein may be standardized by CompanyA as part of the CompanyA Change Management Toolkit, for example. These standardizations may be unique to CompanyA's Change Management Solution and may not necessarily encompass all use cases in the change management universe 700. Customers of the Change Management Toolkit may build their own unique solutions based on the set of standard tools that output the standard data representations, for example. Also described herein are some of the potential data transformations and/or operations that may be performed on the use case data representation. The CompanyA Change Management Toolkit may support some of these operations, for example.

Consider a Raw Inventory Model Specification, such as the raw inventory model specification 1100 described above and as shown in FIG. 11. This Raw Inventory Model Specification may be a CompanyA standardization of the raw inventory data, for example. This Raw Inventory Model Specification may represent what may be discovered from a specific system natively in both data content and relationship. This Raw Inventory Model Specification may be one of the context representations of the CompanyA Data Model, for example.

With respect to the Raw Inventory Model Specification, the Data Objects may include: Class—definition of the hardware, definition of the software application; Device—an instance of hardware Class, an instance of software application Class; Software—software instance associated with a specific device instance; and Operating System (OS)—the Operating System (OS) running. The Relationships may include: Hardware with Software—hardware device and its associated software components may be correlated by keying of the same Class—Class is part of the qualifiers for both Device and Software; Hardware with Hardware—hardware devices may be comparable if associated with the same Class; and Software with Software—software components running on different instances of Device may be comparable due to the matching Class of the underlining Device.

With respect to operations, the following operations may be some of the potential data transformations that may be performed on the Raw Inventory. The operations may include: Inventory Collection—the process to populate inventory Data—the data source may be actual hardware on the system or any persistent data repository on the system—the output of this operation is the Raw Inventory; Inventory Correlation—the process to correlate certain device in the Raw Inventory with its corresponding packaging representation—the output of this operation is the Correlated Inventory—this process requires additional mapping information to perform the data transformation—this correlation occurs on a per device or software basis and is only needed for the device or software that has misalignment with its package; Version Comparison—the process to compare a version of a certain software instance to the version inside its corresponding software package—it may or may not be possible, depending on whether the Raw Inventory is aligned with its corresponding package—the output of this process is the Compared Inventory—this process requires packaging information of the software being compared and it may be performed on a per package basis; and Dependency Checking—the process to validate if the version of the package software has any functional dependencies to the software instance on the system—the output of this operation will be the Compared Inventory—this process requires dependency information of the package software—this operation may be performed on a per package basis.

Following is an XML Schema illustrating a populated XML Example of various illustrative embodiments of the Raw Inventory Model Specification:

```
<Inventory lang="en">
    <Class>
        <HWClass sytemID="009B" hwRev="123" deviceID="159-BIOS">
            <Name><![CDATA[Power Edge 2550]]></Name>
        </HWClass>
        <Device instanceID="1">
            <Software type="FRMW" provider="CompanyA" version="A04"/>
        </Device>
    </Class>
    <Class>
        <HWClass sytemID="009B" hwRev="123" deviceID="160-ESM">
            <Name><![CDATA[Embeded Server Management controller]]></Name>
        </HWClass>
        <Device>
            <Software type="FRMW" provider="CompanyA" version="5.39"/>
        </Device>
    </Class>
    <Class>
        <HWClass sytemID="009B" hwRev="123" deviceID="160-GPB-P">
            <Name><![CDATA[Primary System Backplane]]></Name>
```

-continued

```
        </HWClass>
        <Device>
            <Software type="FRMW" provider="CompanyA" version="1.39"/>
        </Device>
    </Class>
    <Class>
        <PCIClass sytemID="009B" hwRev="123" vendorID="1028" deviceID="000A"
subVendorID="0121" subDeviceID="1028">
            <Name><![CDATA[CompanyA PERC 3/Di RAID Controller]]></Name>
        </PCIClass>
        <Device>
            <PCIInstance bus="1" device="3" function="1"/>
            <Software type="FRMW" provider="CoF" version="2.8.0.6057"/>
            <Software type="DRVR" provider="CoF" version="2.7.1.4944"/>
        </Device>
    </Class>
    <Class>
        <PCIClass hwRev="123" vendorID="1000" deviceID="1960" subVendorID="0520"
subDeviceID="1028">
            <Name><![CDATA[COMPANYA PERC 4/SC RAID Controller]]></Name>
        </PCIClass>
        <Device>
            <PCIInstance bus="2" device="3" function="1"/>
            <Software type="FRMW" provider="COD" version="T231"/>
            <Software type="DRVR" provider="COD" version="5.35.0.0"/>
        </Device>
    </Class>
    <Class>
        <PCIClass hwRev="123" vendorID="101E" deviceID="1960" subVendorID="0475"
subDeviceID="1028">
            <Name><![CDATA[COMPANYA PERC 3/SC RAID Controller]]></Name>
        </PCIClass>
        <Device>
            <PCIInstance bus="3" device="3" function="1"/>
            <Software type="FRMW" provider="COD" version="1.74"/>
            <Software type="DRVR" provider="COD" version="5.35.0.0"/>
        </Device>
    </Class>
    <Class>
        <PCIClass hwRev="123" vendorID="101E" deviceID="1960" subVendorID="0493"
subDeviceID="1028">
            <Name><![CDATA[COMPANYA PERC 3/DC & PERC 3/DCL RAID
Controller]]></Name>
        </PCIClass>
        <Device>
            <PCIInstance bus="3" device="4" function="1"/>
            <Software type="FRMW" provider="COD" version="1.79"/>
            <Software type="DRVR" provider="COD" version="5.39.0.0"/>
        </Device>
        <Device>
            <PCIInstance bus="3" device="5" function="1"/>
            <Software type="FRMW" provider="COD" version="1.85"/>
            <Software type="DRVR" provider="COD" version="5.39.0.0"/>
        </Device>
    </Class>
    <Class>
        <PCIClass hwRev="123" vendorID="9004" deviceID="8078" subVendorID="7880"
subDeviceID="9004">
            <Name><![CDATA[CoF AIC-7880 PCI SCSI Controller]]></Name>
        </PCIClass>
        <Device>
            <PCIInstance bus="4" device="5" function="1"/>
            <Software type="DRVR" provider="CoF" version="5.0.2183.1"/>
        </Device>
    </Class>
    <Class>
        <PCIClass hwRev="123" vendorID="9005" deviceID="001F" subVendorID="000F"
subDeviceID="9005">
            <Name><![CDATA[CoF AHA-2940U2/U2W PCI SCSI Controller]]></Name>
        </PCIClass>
        <Device>
            <PCIInstance bus="4" device="5" function="2"/>
            <Software type="DRVR" provider="CoF" version="5.0.2183.1"/>
        </Device>
    </Class>
    <Class>
        <PCIClass hwRev="123" vendorID="8086" deviceID="1229" subDeviceID="009B"
subVendorID="1028">
            <Name><![CDATA[CoE 8255x-based PCI Ethernet Adapter
```

```
(10/100)]]></Name>
    </PCIClass>
    <Device>
        <PCIInstance bus="4" device="1" function="2"/>
        <Software type="DRVR" provider="CoE" version="4.1.67.0"/>
    </Device>
    <Device>
        <PCIInstance bus="6" device="1" function="2"/>
        <Software type="DRVR" provider="CoE" version="4.1.67.0"/>
    </Device>
</Class>
<Class>
    <PCIClass hwRev="123" vendorID="8086" deviceID="1329" subDeviceID="009B" subVendorID="1028">
        <Name><![CDATA[CoE PRO/1000 Gigabit Adapters Adapter]]></Name>
    </PCIClass>
    <Device>
        <PCIInstance bus="6" device="1" function="2"/>
        <Software type="DRVR" provider="CoE" version="6.1.67.0"/>
    </Device>
</Class>
<Class>
    <VirtualClass deviceID="1769">
        <Name><![CDATA[CoE Advanced Network Services Virtual Adapter]]></Name>
    </VirtualClass>
    <Device>
        <Software type="DRVR" provider="CoE" version="6.20.0.0"/>
    </Device>
</Class>
<Class>
    <VirtualClass deviceID="1239">
        <Name><![CDATA[COMPANYA Array Manager]]></Name>
    </VirtualClass>
    <Device>
        <Software type="APP" provider="CompanyA" version="3.4"/>
    </Device>
</Class>
<Class>
    <VirtualClass deviceID="1439">
        <Name><![CDATA[COMPANYA Instrumentation Agent]]></Name>
    </VirtualClass>
    <Device>
        <Software type="APP" provider="CompanyA" version="4.11"/>
    </Device>
</Class>
<Class>
    <VirtualClass deviceID="1339">
        <Name><![CDATA[COMPANYA OpenManage Server Administrator]]></Name>
    </VirtualClass>
    <Device>
        <Software type="APP" provider="CompanyA" version="2.0"/>
    </Device>
</Class>
<Class>
    <VirtualClass deviceID="3498">
        <Name><![CDATA[CoE ProSet]]></Name>
    </VirtualClass>
    <Device>
        <Software type="APP" provider="CoE" version="8.0.0.0"/>
    </Device>
</Class>
```

Figure 12:
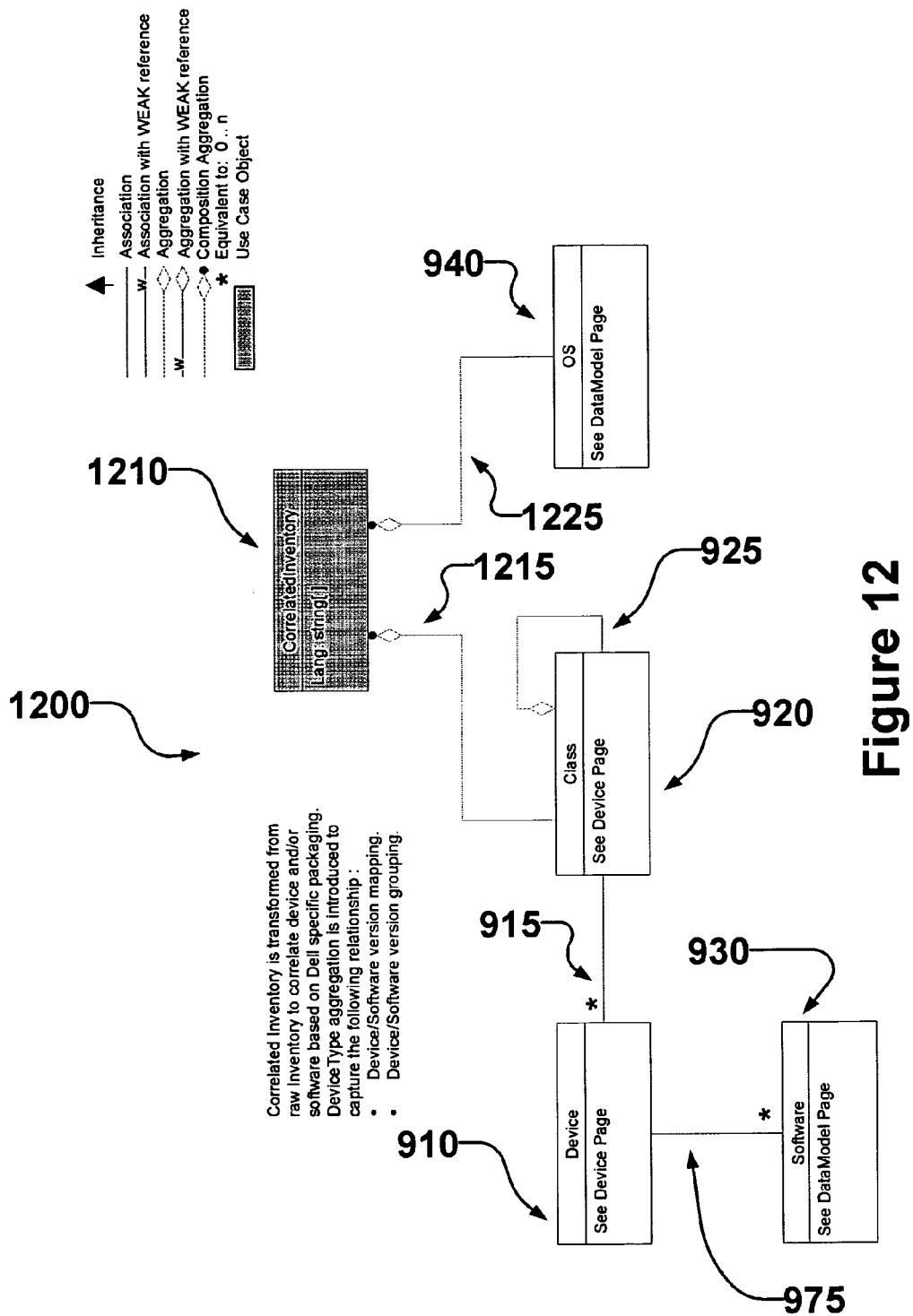
FIG. 12 schematically illustrates an example of the UML representation illustrating a correlated inventory model specification in various illustrative embodiments of an update applicability data model according to teachings of the present disclosure.

FIG. 12 schematically illustrates an example of the UML representation illustrating a correlated inventory model specification 1200 in various illustrative embodiments of an update applicability data model according to teachings of the present disclosure. The UML representation of the correlated inventory model specification 1200 shows a correlated inventory class 1210, the device class 910, the class of classes 920, the software class 930, and the operating system (OS) class 940. The correlated inventory class 1210 may have the attribute of Lang: string [ ]. The device class 910, the class of classes 920, the software class 930, and the operating system (OS) class 940 may have the attributes as described above, and as shown in FIGS. 9 and 10. The UML representation of the correlated inventory model specification 1200 also shows two associations, one aggregation, and two composition aggregations: (1) the class with device association in the inventory context, as indicated by the association 915 between the device class 910 and the class of classes 920, where class may have multiple instances labeled 0, 1, 2, . . . , n, where n is any finite number; (2) the software with device association in the inventory context, as indicated by the association 975 between the software class 930 and the device class 910, where the multiple instances of software and/or software components, labeled 0, 1, 2, . . . , n, where n is any finite number, may run on a specific device and/or instance of a device, in a many-to-1 relationship; (3) the class with class aggregation, as indicated by the aggregation 925 between the class of classes 920 with the class of classes 920 itself, where class is a grouping of other classes; (4) a class with correlated inventory composition aggregation, as indicated by a composition aggregation 1215 between the class of classes 920 with the correlated inventory class 1210; and (5) an operating system (OS) with correlated inventory composition aggregation, as indicated by a composition aggregation 1225 between the operating system (OS) class 940 with the correlated inventory class 1210. The correlated inventory given by the correlated inventory model specification 1200 may be transformed from the raw inventory, given by the raw inventory model specification 1100, as described above, and as shown in FIG. 11, to correlate device and/or software based on specific packaging, such as CompanyA specific packaging. A DeviceType aggregation may be introduced to capture the following relationships: (a) device/software version mapping and (b) device/software version grouping.

Consider a Correlated Inventory Model Specification, such as the correlated inventory model specification 1200 described above and as shown in FIG. 12. With respect to the Correlated Inventory Model Specification, the Data Objects may include: Class—definition of the hardware, definition of the software application; Device—an instance of hardware Class, an instance of software application Class; Software—software instance associated with a specific device instance; and Operating System (OS)—the Operating System (OS) running. In addition to all the Relationships represented in the Raw Inventory data model, Device grouping and Software grouping may be introduced to align what is on the packaging side. The Relationships may include: Hardware with Software—hardware device and its associated software components may be correlated by keying of the same Class—Class is part of the qualifiers for both Device and Software; Hardware with Hardware—hardware devices may be comparable if associated with the same Class; Software with Software—software components running on different instances of Device may be comparable due to the matching Class of the underlining Device; Device grouping may be represented through Class grouping; and Software grouping may be represented through Class grouping.

With respect to operations, the following operations may be some of the potential data transformations that may be performed on the Correlated Inventory. The operations may include: Inventory De-correlation—the process to transform the correlated device and/or software back to its raw form; Version Comparison—the process to compare a version of a certain software instance to the version inside its corresponding software package—this process requires packaging information of the software being compared and it may be performed on a per package basis; and Dependency Checking—the process to validate if the version of the package software has any functional dependencies to the software instance on the system—this process requires dependency information of the package software—this operation may be performed on a per package basis.

Following is an XML Schema illustrating a populated XML Example of various illustrative embodiments of the Correlated Inventory Model Specification, where the bold section may represent devices that get correlated and a New Class element may be added to represent the correlated Class:

```
<Inventory lang="en">
  <Class>
    <HWClass sytemID="009B" hwRev="123" deviceID="159-BIOS">
      <Name><![CDATA[Power Edge 2550]]></Name>
    </HWClass>
    <Device>
      <Software type="FRMW" provider="CompanyA" version="A04"/>
    </Device>
  </Class>
  <Class>
    <VirtualClass deviceID="160">
      <Name><![CDATA[CompanyA ESM Package]]></Name>
    </VirtualClass>
    <Device>
      <Software type="FRMW" provider="CompanyA" version="A56"/>
    </Device>
    <Class>
      <HWClass sytemID="009B" hwRev="123" deviceID="160-ESM">
        <Name><![CDATA[Embeded Server Management controller]]></Name>
      </HWClass>
      <Device>
        <Software type="FRMW" provider="CompanyA" version="5.39"/>
      </Device>
    </Class>
    <Class>
      <HWClass sytemID="009B" hwRev="123" deviceID="160-GPB-P">
        <Name><![CDATA[Primary System Backplane]]></Name>
      </HWClass>
      <Device>
        <Software type="FRMW" provider="CompanyA" version="1.39"/>
      </Device>
    </Class>
  </Class>
  <Class>
    <PCIClass sytemID="009B" hwRev="123" vendorID="1028" deviceID="000A" subVendorID="0121" subDeviceID="1028">
      <Name><![CDATA[CompanyA PERC 3/Di RAID Controller]]></Name>
```

-continued

```
    </PCIClass>
    <Device>
        <PCIInstance bus="1" device="3" function="1"/>
        <Software type="FRMW" provider="CoF" version="2.8.0.6057"/>
        <Software type="DRVR" provider="CoF" version="2.7.1.4944"/>
    </Device>
</Class>
<Class>
    <PCIClass hwRev="123" vendorID="1000" deviceID="1960" subVendorID="0520" subDeviceID="1028">
        <Name><![CDATA[COMPANYA PERC 4/SC RAID Controller]]></Name>
    </PCIClass>
    <Device>
        <PCIInstance bus="2" device="3" function="1"/>
        <Software type="FRMW" provider="COD" version="T231"/>
        <Software type="DRVR" provider="COD" version="5.35.0.0"/>
    </Device>
</Class>
<Class>
    <PCIClass hwRev="123" vendorID="101E" deviceID="1960" subVendorID="0475" subDeviceID="1028">
        <Name><![CDATA[COMPANYA PERC 3/SC RAID Controller]]></Name>
    </PCIClass>
    <Device>
        <PCIInstance bus="3" device="3" function="1"/>
        <Software type="FRMW" provider="COD" version="1.74"/>
        <Software type="DRVR" provider="COD" version="5.35.0.0"/>
    </Device>
</Class>
<Class>
    <PCIClass hwRev="123" vendorID="101E" deviceID="1960" subVendorID="0493" subDeviceID="1028">
        <Name><![CDATA[COMPANYA PERC 3/DC & PERC 3/DCL RAID Controller]]></Name>
    </PCIClass>
    <Device>
        <PCIInstance bus="3" device="4" function="1"/>
        <Software type="FRMW" provider="COD" version="1.79"/>
        <Software type="DRVR" provider="COD" version="5.39.0.0"/>
    </Device>
    <Device>
        <PCIInstance bus="3" device="5" function="1"/>
        <Software type="FRMW" provider="COD" version="1.85"/>
        <Software type="DRVR" provider="COD" version="5.39.0.0"/>
    </Device>
</Class>
<Class>
    <PCIClass hwRev="123" vendorID="9004" deviceID="8078" subVendorID="7880" subDeviceID="9004">
        <Name><![CDATA[CoF AIC-7880 PCI SCSI Controller]]></Name>
    </PCIClass>
    <Device>
        <PCIInstance bus="4" device="5" function="1"/>
        <Software type="DRVR" provider="CoF" version="5.0.2183.1"/>
    </Device>
</Class>
<Class>
    <PCIClass hwRev="123" vendorID="9005" deviceID="001F" subVendorID="000F" subDeviceID="9005">
        <Name><![CDATA[CoF AHA-2940U2/U2W PCI SCSI Controller]]></Name>
    </PCIClass>
    <Device>
        <PCIInstance bus="4" device="5" function="2"/>
        <Software type="DRVR" provider="CoF" version="5.0.2183.1"/>
    </Device>
</Class>
<Class>
    <VirtualClass deviceID="2345">
        <Name><![CDATA[CoE Pro Family of adapters]]></Name>
    </VirtualClass>
    <Device>
        <Software type="DRVR" provider="CoE" version="6.6"/>
    </Device>
    <Class>
        <PCIClass hwRev="123" vendorID="8086" deviceID="1229" subDeviceID="009B" subVendorID="1028">
            <Name><![CDATA[CoE 8255x-based PCI Ethernet Adapter (10/100)]]></Name>
```

```xml
      </PCIClass>
      <Device>
        <PCIInstance bus="4" device="1" function="2"/>
        <Software type="DRVR" provider="CoE" version="4.1.67.0"/>
      </Device>
      <Device>
        <PCIInstance bus="6" device="1" function="2"/>
        <Software type="DRVR" provider="CoE" version="4.1.67.0"/>
      </Device>
    </Class>
</Class>
<Class>
  <VirtualClass deviceID="2346">
    <Name><![CDATA[CoE Pro Family of adapters]]></Name>
  </VirtualClass>
  <Device>
    <Software type="DRVR" provider="CoE" version="6.6"/>
  </Device>
  <Class>
    <PCIClass hwRev="123" vendorID="8086" deviceID="1329"
subDeviceID="009B" subVendorID="1028">
      <Name><![CDATA[CoE PRO/1000 Gigabit Adapters Adapter]]></Name>
    </PCIClass>
    <Device>
      <PCIInstance bus="6" device="1" function="2"/>
      <Software type="DRVR" provider="CoE" version="6.1.67.0"/>
    </Device>
  </Class>
</Class>
<Class>
  <VirtualClass deviceID="1769">
    <Name><![CDATA[CoE Advanced Network Services Virtual
Adapter]]></Name>
  </VirtualClass>
  <Device>
    <Software type="DRVR" provider="CoE" version="6.20.0.0"/>
  </Device>
</Class>
<Class>
  <VirtualClass deviceID="1239">
    <Name><![CDATA[COMPANYA Array Manager]]></Name>
  </VirtualClass>
  <Device>
    <Software type="APP" provider="CompanyA" version="3.4"/>
  </Device>
</Class>
<Class>
  <VirtualClass deviceID="1439">
    <Name><![CDATA[COMPANYA Instrumentation Agent]]></Name>
  </VirtualClass>
  <Device>
    <Software type="APP" provider="CompanyA" version="4.11"/>
  </Device>
</Class>
<Class>
  <VirtualClass deviceID="1339">
    <Name><![CDATA[COMPANYA OpenManage Server
Administrator]]></Name>
  </VirtualClass>
  <Device>
    <Software type="APP" provider="CompanyA" version="2.0"/>
  </Device>
</Class>
<Class>
  <VirtualClass deviceID="3498">
    <Name><![CDATA[CoE ProSet]]></Name>
  </VirtualClass>
  <Device>
    <Software type="APP" provider="CoE" version="8.0.0.0"/>
  </Device>
</Class>
<Class>
  <VirtualClass deviceID="3198">
    <Name><![CDATA[CompanyA IT Assistant]]></Name>
  </VirtualClass>
  <Device>
    <Software type="APP" provider="CompanyAI" version="6.5.0.0"/>
```

```
    </Device>
  </Class>
</Inventory>
```

Figure 13:
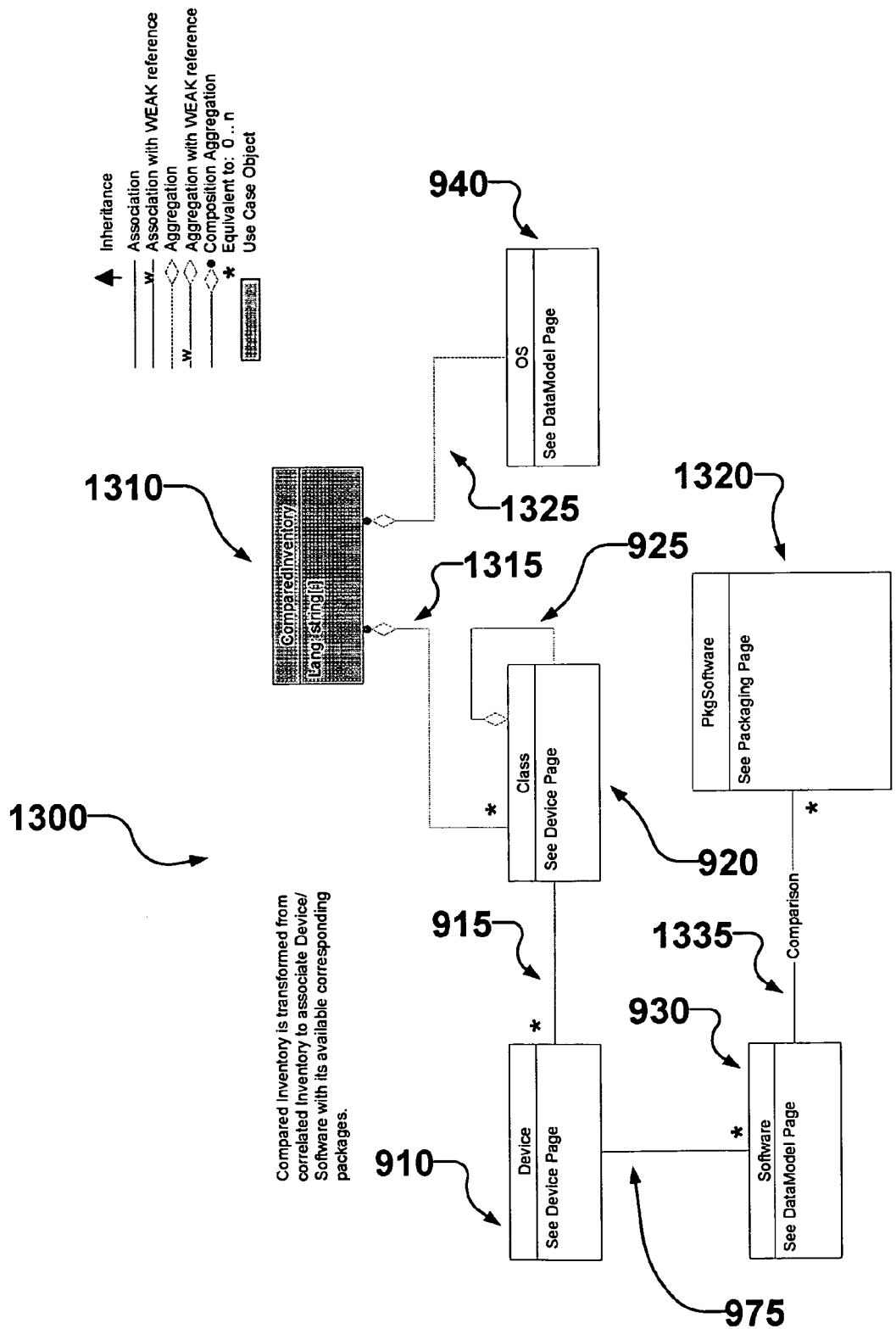
FIG. 13 schematically illustrates an example of the UML representation illustrating a compared inventory model specification in various illustrative embodiments of an update applicability data model according to teachings of the present disclosure.

FIG. 13 schematically illustrates an example of the UML representation illustrating a compared inventory model specification 1300 in various illustrative embodiments of an update applicability data model according to teachings of the present disclosure. The UML representation of the compared inventory model specification 1300 shows a compared inventory class 1310, a software package class 1320, the device class 910, the class of classes 920, the software class 930, and the operating system (OS) class 940. The compared inventory class 1310 may have the attribute of Lang: string [ ]. The software package class 1320 may have one or more attributes, as shown and described below with reference to FIGS. 14 and/or 15. The device class 910, the class of classes 920, the software class 930, and the operating system (OS) class 940 may have the attributes as described above, and as shown in FIGS. 9 and 10. The UML representation of the compared inventory model specification 1300 also shows three associations, one aggregation, and two composition aggregations: (1) the class with device association in the inventory context, as indicated by the association 915 between the device class 910 and the class of classes 920, where class may have multiple instances labeled 0, 1, 2, . . . , n, where n is any finite number; (2) the software with device association in the inventory context, as indicated by the association 975 between the software class 930 and the device class 910, where the multiple instances of software and/or software components, labeled 0, 1, 2, . . . , n, where n is any finite number, may run on a specific device and/or instance of a device, in a many-to-1 relationship; (3) a software with software package comparison association in the inventory context and/or the packaging context, as indicated by the association 1335 between the software class 930 and the software package class 1320, where multiple software update package releases, labeled 0, 1, 2, . . . , n, where n is any finite number, may have a specific software and/or software component and/or one or more instances of a specific software and/or software component, in a many-to-1 relationship; (4) the class with class aggregation, as indicated by the aggregation 925 between the class of classes 920 with the class of classes 920 itself, where class is a grouping of other classes; (5) a class with compared inventory composition aggregation, as indicated by a composition aggregation 1315 between the class of classes 920 with the compared inventory class 1310, where multiple classes and/or instances of classes, labeled 0, 1, 2, . . . , n, where n is any finite number, may be compared in the composition aggregation 1315, in a many-to-1 relationship; and (6) an operating system (OS) with compared inventory composition aggregation, as indicated by a composition aggregation 1325 between the operating system (OS) class 940 with the compared inventory class 1310. The compared inventory given by the compared inventory model specification 1300 may be transformed from the correlated inventory, given by the correlated inventory model specification 1200, as described above, and as shown in FIG. 12, to associate device and/or software with avaiable corresponding packages.

Consider a Compared Inventory Model Specification, such as the compared inventory model specification 1300 described above and as shown in FIG. 13. Following is an XML Schema illustrating a populated XML Example of various illustrative embodiments of the Compared Inventory Model Specification, where the bold section may represent devices that get compared and a PkgSoftware element may be added to to the proper software element correlation and comparison information once a match is found during comparison. The PkgSoftware element may be used to capture specific software release information and may represent single software components and/or a single virtual software component that consists of multiple components. The PkgSoftware element may be the CompanyA update package (COAUP) XML representation, where UID may be the update release ID of the CompanyA update package (COAUP), and Category may be the online classification grouping of a specific release.

```
<Inventory lang="en">
  <Class>
    <HWClass sytemID="009B" hwRev="123" deviceID="159-BIOS">
      <Name><![CDATA[Power Edge 2550]]></Name>
    </HWClass>
    <Device>
      <Software type="FRMW" provider="CompanyA" version="A04"/>
    </Device>
  </Class>
  <Class>
    <VirtualClass deviceID="160">
      <Name><![CDATA[CompanyA ESM Package]]></Name>
    </VirtualClass>
    <Device>
      <Software type="FRMW" provider="CompanyA" version="A56">
        <PkgSoftware releaseID="R65642" version="A59" url="c:\repository\esm59.exe"/>
        <PkgSoftware releaseID="R65640" version="A58" url="c:\repository\esm58.exe"/>
      </Software>
    </Device>
  <Class>
```

-continued

```xml
    <HWClass sytemID="009B" hwRev="123" deviceID="160-ESM">
      <Name><![CDATA[Embeded Server Management controller]]></Name>
    </HWClass>
    <Device>
      <Software type="FRMW" provider="CompanyA" version="5.39"/>
    </Device>
  </Class>
  <Class>
    <HWClass sytemID="009B" hwRev="123" deviceID="160-GPB-P">
      <Name><![CDATA[Primary System Backplane]]></Name>
    </HWClass>
    <Device>
      <Software type="FRMW" provider="CompanyA" version="1.39"/>
    </Device>
  </Class>
</Class>
<Class>
  <PCIClass sytemID="009B" hwRev="123" vendorID="1028" deviceID="000A" subVendorID="0121" subDeviceID="1028">
    <Name><![CDATA[CompanyA PERC 3/Di RAID Controller]]></Name>
  </PCIClass>
  <Device>
    <PCIInstance bus="1" device="3" function="1"/>
    <Software type="FRMW" provider="CoF" version="2.8.0.6057">
      <PkgSoftware releaseID="R15642" version="2.9.0.6057"/>
      <PkgSoftware releaseID="R14642" version="2.7.1.6057"/>
    </Software>
    <Software type="DRVR" provider="CoF" version="2.7.1.4944"/>
  </Device>
</Class>
<Class>
  <PCIClass hwRev="123" vendorID="1000" deviceID="1960" subVendorID="0520" subDeviceID="1028">
    <Name><![CDATA[COMPANYA PERC 4/SC RAID Controller]]></Name>
  </PCIClass>
  <Device>
    <PCIInstance bus="2" device="3" function="1"/>
    <Software type="FRMW" provider="COD" version="T231"/>
    <Software type="DRVR" provider="COD" version="5.35.0.0"/>
  </Device>
</Class>
<Class>
  <PCIClass hwRev="123" vendorID="101E" deviceID="1960" subVendorID="0475" subDeviceID="1028">
    <Name><![CDATA[COMPANYA PERC 3/SC RAID Controller]]></Name>
  </PCIClass>
  <Device>
    <PCIInstance bus="3" device="3" function="1"/>
    <Software type="FRMW" provider="COD" version="1.74"/>
    <Software type="DRVR" provider="COD" version="5.35.0.0"/>
  </Device>
</Class>
<Class>
  <PCIClass hwRev="123" vendorID="101E" deviceID="1960" subVendorID="0493" subDeviceID="1028">
    <Name><![CDATA[COMPANYA PERC 3/DC & PERC 3/DCL RAID Controller]]></Name>
  </PCIClass>
  <Device>
    <PCIInstance bus="3" device="4" function="1"/>
    <Software type="FRMW" provider="COD" version="1.79"/>
    <Software type="DRVR" provider="COD" version="5.39.0.0"/>
  </Device>
  <Device>
    <PCIInstance bus="3" device="5" function="1"/>
    <Software type="FRMW" provider="COD" version="1.85"/>
    <Software type="DRVR" provider="COD" version="5.39.0.0"/>
  </Device>
</Class>
<Class>
  <PCIClass hwRev="123" vendorID="9004" deviceID="8078" subVendorID="7880" subDeviceID="9004">
    <Name><![CDATA[CoF AIC-7880 PCI SCSI Controller]]></Name>
  </PCIClass>
  <Device>
    <PCIInstance bus="4" device="5" function="1"/>
    <Software type="DRVR" provider="CoF" version="5.0.2183.1"/>
  </Device>
</Class>
```

-continued

```
<Class>
    <PCIClass hwRev="123" vendorID="9005" deviceID="001F" subVendorID="000F" subDeviceID="9005">
        <Name><![CDATA[CoF AHA-2940U2/U2W PCI SCSI Controller]]></Name>
    </PCIClass>
    <Device>
        <PCIInstance bus="4" device="5" function="2"/>
        <Software type="DRVR" provider="CoF" version="5.0.2183.1"/>
    </Device>
</Class>
<Class>
    <VirtualClass deviceID="2345">
        <Name><![CDATA[CoE Pro Family of adapters]]></Name>
    </VirtualClass>
    <Device>
        <Software type="DRVR" provider="CoE" version="6.6">
            <PkgSoftware releaseID="R14842" version="6.0"/>
            <PkgSoftware releaseID="R16842" version="7.0"/>
        </Software>
    </Device>
    <Class>
        <PCIClass hwRev="123" vendorID="8086" deviceID="1229" subDeviceID="009B" subVendorID="1028">
            <Name><![CDATA[CoE 8255x-based PCI Ethernet Adapter (10/100)]]></Name>
        </PCIClass>
        <Device>
            <PCIInstance bus="4" device="1" function="2"/>
            <Software type="DRVR" provider="CoE" version="4.1.67.0"/>
        </Device>
        <Device>
            <PCIInstance bus="6" device="1" function="2"/>
            <Software type="DRVR" provider="CoE" version="4.1.67.0"/>
        </Device>
    </Class>
</Class>
<Class>
    <VirtualClass deviceID="2346">
        <Name><![CDATA[CoE Pro Family of adapters]]></Name>
    </VirtualClass>
    <Device>
        <Software type="DRVR" provider="CoE" version="6.6">
            <PkgSoftware releaseID="R14842" version="6.0"/>
            <PkgSoftware releaseID="R16842" version="7.0"/>
        </Software>
    </Device>
    <Class>
        <PCIClass hwRev="123" vendorID="8086" deviceID="1329" subDeviceID="009B" subVendorID="1028">
            <Name><![CDATA[CoE PRO/1000 Gigabit Adapters Adapter]]></Name>
        </PCIClass>
        <Device>
            <PCIInstance bus="6" device="1" functiom="2"/>
            <Software type="DRVR" provider="CoE" version="6.1.67.0"/>
        </Device>
    </Class>
</Class>
<Class>
    <VirtualClass deviceID="1769">
        <Name><![CDATA[CoE Advanced Network Services Virtual Adapter]]></Name>
    </VirtualClass>
    <Device>
        <Software type="DRVR" provider="CoE" version="6.20.0.0"/>
    </Device>
</Class>
<Class>
    <VirtualClass deviceID="1239">
        <Name><![CDATA[COMPANYA Array Manager]]></Name>
    </VirtualClass>
    <Device>
        <Software type="APP" provider="CompanyA" version="3.4"/>
    </Device>
</Class>
<Class>
    <VirtualClass deviceID="1439">
        <Name><![CDATA[COMPANYA Instrumentation Agent]]></Name>
    </VirtualClass>
    <Device>
```

-continued

```
    <Software type="APP" provider="CompanyA" version="4.11"/>
   </Device>
  </Class>
  <Class>
   <VirtualClass deviceID="1339">
    <Name><![CDATA[COMPANYA OpenManage Server
Administrator]]></Name>
   </VirtualClass>
   <Device>
    <Software type="APP" provider="CompanyA" version="2.0"/>
   </Device>
  </Class>
  <Class>
   <VirtualClass deviceID="3498">
    <Name><![CDATA[CoE ProSet]]></Name>
   </VirtualClass>
   <Device>
    <Software type="APP" provider="CoE" version="8.0.0.0"/>
   </Device>
  </Class>
</Inventory>
```

Figure 14:
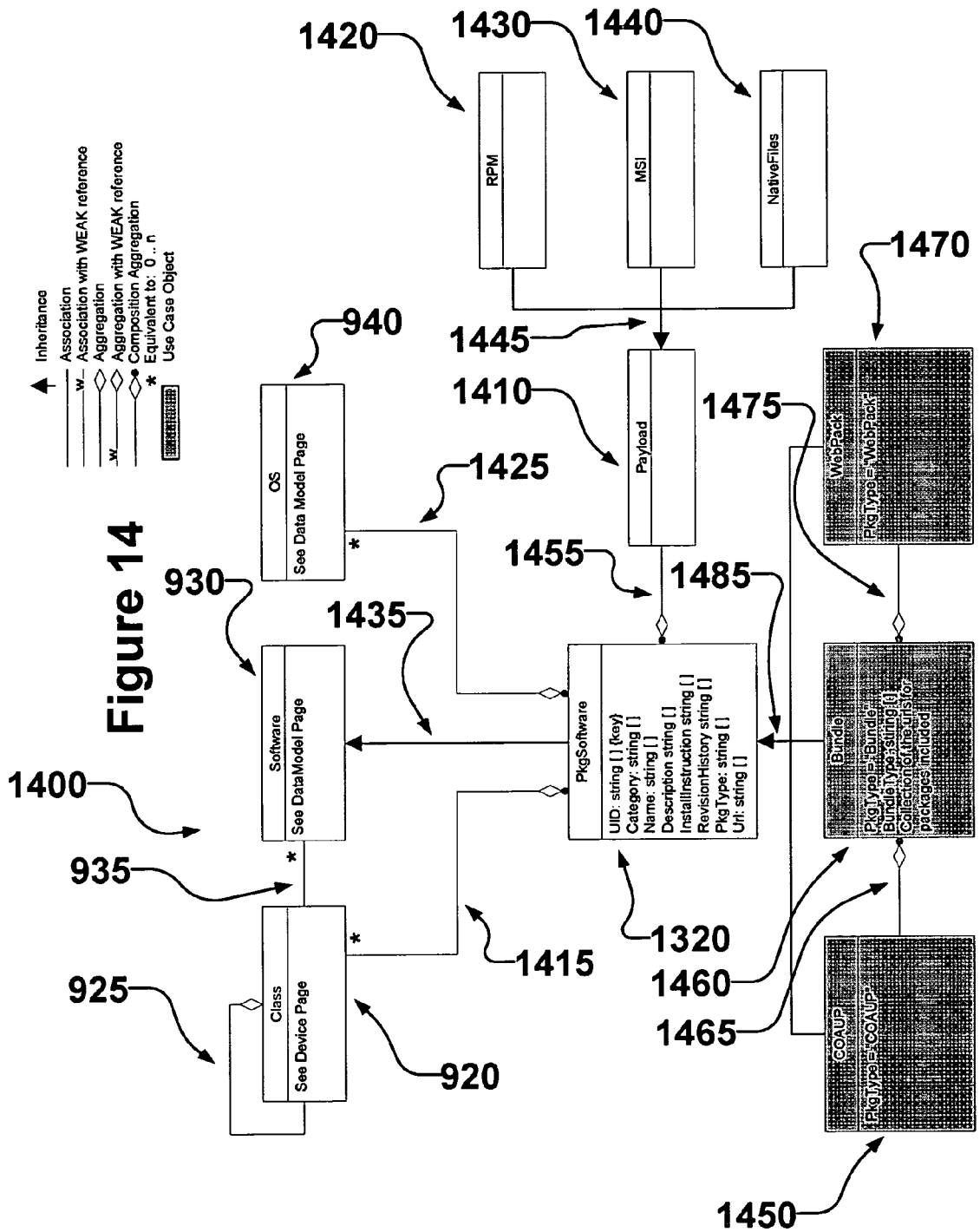
FIG. 14 schematically illustrates an example of the UML representation illustrating a package model specification in various illustrative embodiments of an update applicability data model according to teachings of the present disclosure.

FIG. 14 schematically illustrates an example of the UML representation illustrating a package model specification 1400 in various illustrative embodiments of an update applicability data model according to teachings of the present disclosure. The UML representation of the package model specification 1400 shows the software package class 1320, the class of classes 920, the software class 930, the operating system (OS) class 940, a payload class 1410, an RPM class 1420, an MSI class 1430, a native files class 1440, a CompanyA update package (COAUP) class 1450, a bundle class 1460, and a web package class 1470. The software package class 1320 may have the attributes of UID: string [ ]{key}, Category: string [ ], Name: string [ ], Description: string [ ], InstallInstruction: string [ ], RevisionHistory: string [ ], PkgType: string [ ], and universal resource locator (URL): string [ ]{key}, according to the UML representation of the package model specification 1400, as shown in FIG. 14, for example. The class of classes 920, the software class 930, and the operating system (OS) class 940 may have the attributes as described above, and as shown in FIGS. 9 and 10. The software class 930, the software package class 1320, and the payload class 1410 may each have inherited attributes, as shown by inheritance arrows 1435, 1485, and 1445, respectively. The software class 930 may have inherited attributes from the software package class 1320, as shown by the inheritance arrow 1435. The software package class 1320 may have inherited attributes from the CompanyA update package (COAUP) class 1450, the bundle class 1460, and the web package class 1470, as shown by the inheritance arrow 1485. The CompanyA update package (COAUP) class 1450 may have the attribute of PkgType="DUP." The bundle class 1460 may have the attributes of PkgType="Bundle," BundleType: string [ ], and collection of the universal resource locators (URLs) for packages may be included. The web package class 1470 may have the attribute of PkgType="WebPack." The payload class 1410 may have inherited attributes from the RPM class 1420, the MSI class 1430, and the native files class 1440, as shown by the inheritance arrow 1445. The UML representation of the package model specification 1400 also shows one association, one aggregation, and five composition aggregations: (1) the class with software association in the packaging context, as indicated by the association 935 between the class of classes 920 and the software class 930, where the class may include multiple software releases labeled 0, 1, 2, . . . , n, where n is any finite number, and one or more of the software releases may be applicable to other software; (2) the class with class aggregation, as indicated by the aggregation 925 between the class of classes 920 with the class of classes 920 itself, where class is a grouping of other classes; (3) a class with software package composition aggregation, as indicated by a composition aggregation 1415 between the class of classes 920 with the software package class 1320, where multiple classes and/or instances of classes, labeled 0, 1, 2, . . . , n, where n is any finite number, may be included in the composition aggregation 1415, in a many-to-1 relationship; (4) an operating system (OS) with software package composition aggregation, as indicated by a composition aggregation 1425 between the operating system (OS) class 940 with the software package class 1320, where multiple operating systems (OS's), labeled 0, 1, 2, . . . , n, where n is any finite number, may be included in the composition aggregation 1425, in a many-to-1 relationship; (5) a payload with software package composition aggregation, as indicated by a composition aggregation 1455 between the payload class 1410 with the software package class 1320; (6) a CompanyA update package (COAUP) with bundle composition aggregation, as indicated by a composition aggregation 1465 between the CompanyA update package (COAUP) class 1450 with the bundle class 1460; and (7) a web package with bundle composition aggregation, as indicated by a composition aggregation 1475 between the web package class 1470 with the bundle class 1460.

Figure 15:
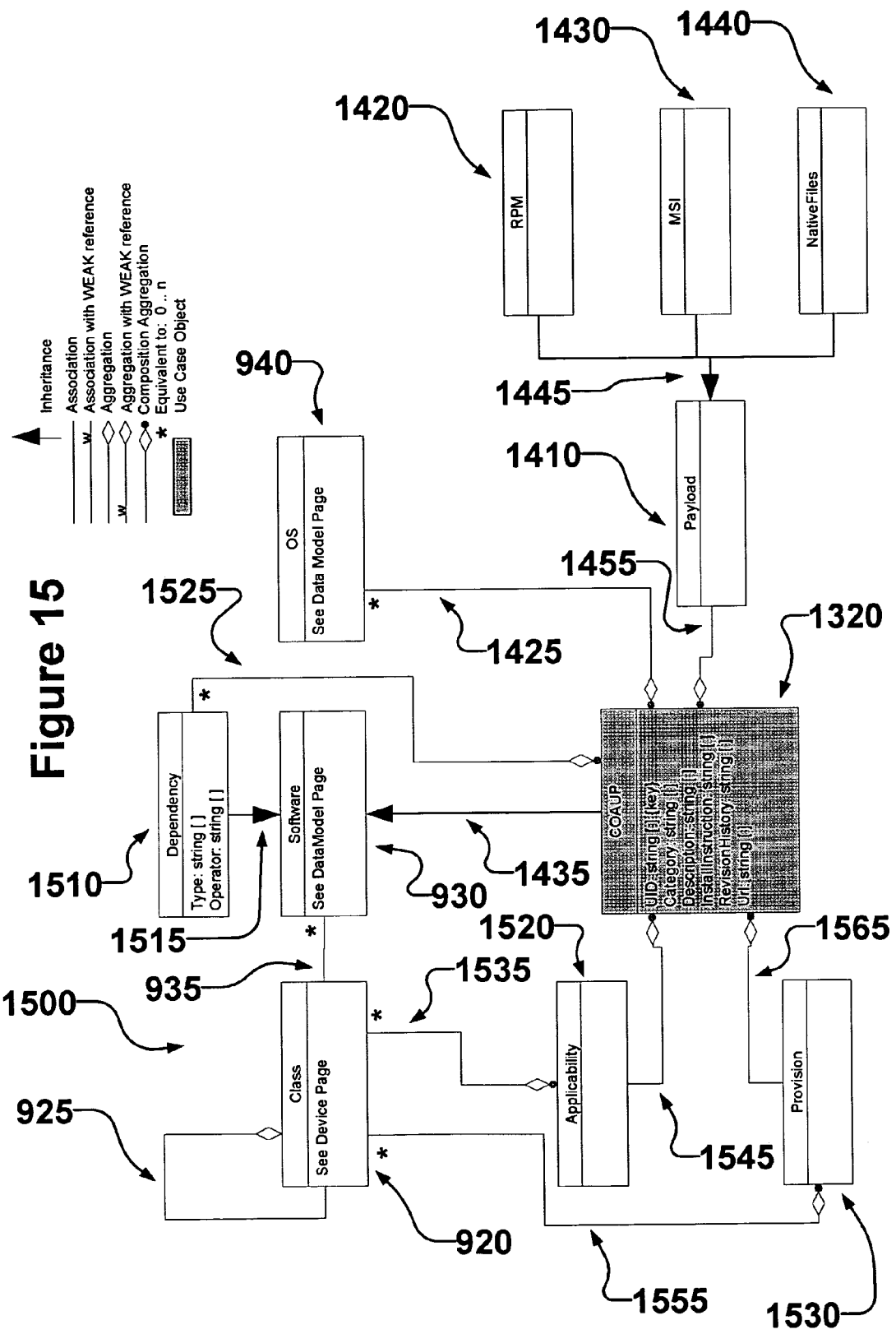
FIG. 15 schematically illustrates an example of the UML representation illustrating another package model specification in various illustrative embodiments of an update applicability data model according to teachings of the present disclosure.

FIG. 15 schematically illustrates an example of the UML representation illustrating another package model specification 1500 in various illustrative embodiments of an update applicability data model according to teachings of the present disclosure. The UML representation of the package model specification 1500 shows the software package class 1320, the class of classes 920, the software class 930, the operating system (OS) class 940, a payload class 1410, an RPM class 1420, an MSI class 1430, a native files class 1440, a dependency class 1510, an applicability class 1520, and a provision class 1530. The software package class 1320 may have the attributes of UID: string [ ]{key}, Category: string [ ], Description: string [ ], InstallInstruction: string [ ], RevisionHistory: string [ ], and universal resource locator (URL): string [ ]{key}, according to the UML representation of the package model specification 1500, as shown in FIG. 15, for example. The class of classes 920, the software class 930, and the operating system (OS) class 940 may have the attributes as described above, and as shown in FIGS. 9 and 10. The software class 930 and the payload class 1410 may each have inherited attributes, as shown by inheritance arrows 1435, 1515, and 1445, respectively. The software class 930 may have inherited attributes from the software package class 1320, as shown by the inheritance arrow 1435, and from the dependency class 1510, as shown by the inheritance arrow 1515. The dependency class 1510 may have the attributes of Type: string [ ] and Operator: string [ ]. The payload class 1410 may have inherited attributes from the RPM class 1420, the MSI class 1430, and the native files class 1440, as shown by the inheritance arrow 1445. The UML representation of the package model specification 1500 also shows one association, one aggregation, and seven composition aggregations: (1) the class with software association in the packaging context, as indicated by the association 935 between the class of classes 920 and the software class 930, where the class may include multiple software releases labeled 0, 1, 2, . . . , n, where n is any finite number, and one or more of the software releases may be applicable to other software; (2) the class with class aggregation, as indicated by the aggregation 925 between the class of classes 920 with the class of classes 920 itself, where class is a grouping of other classes; (3) a class with applicability composition aggregation, as indicated by a composition aggregation 1535 between the class of classes 920 with the applicability class 1520, where multiple classes and/or instances of classes, labeled 0, 1, 2, . . . , n, where n is any finite number, may be included in the composition aggregation 1535, in a many-to-1 relationship; (4) an applicability with software package composition aggregation, as indicated by a composition aggregation 1545 between the applicability class 1520 with the software package class 1320; (5) a class with provision composition aggregation, as indicated by a composition aggregation 1555 between the class of classes 920 with the provision class 1530, where multiple classes and/or instances of classes, labeled 0, 1, 2, . . . , n, where n is any finite number, may be included in the composition aggregation 1555, in a many-to-1 relationship; (6) a provision with software package composition aggregation, as indicated by a composition aggregation 1565 between the provision class 1530 with the software package class 1320; (7) the operating system (OS) with software package composition aggregation, as indicated by the composition aggregation 1425 between the operating system (OS) class 940 with the software package class 1320, where multiple operating systems (OS's), labeled 0, 1, 2, . . . , n, where n is any finite number, may be included in the composition aggregation 1425, in a many-to-1 relationship; (8) a dependency with software package composition aggregation, as indicated by a composition aggregation 1525 between the dependency class 1510 with the software package class 1320, where multiple dependencies, labeled 0, 1, 2, . . . , n, where n is any finite number, may be included in the composition aggregation 1525, in a many-to-1 relationship; and (9) the payload with software package composition aggregation, as indicated by the composition aggregation 1455 between the payload class 1410 with the software package class 1320.

Figure 16:
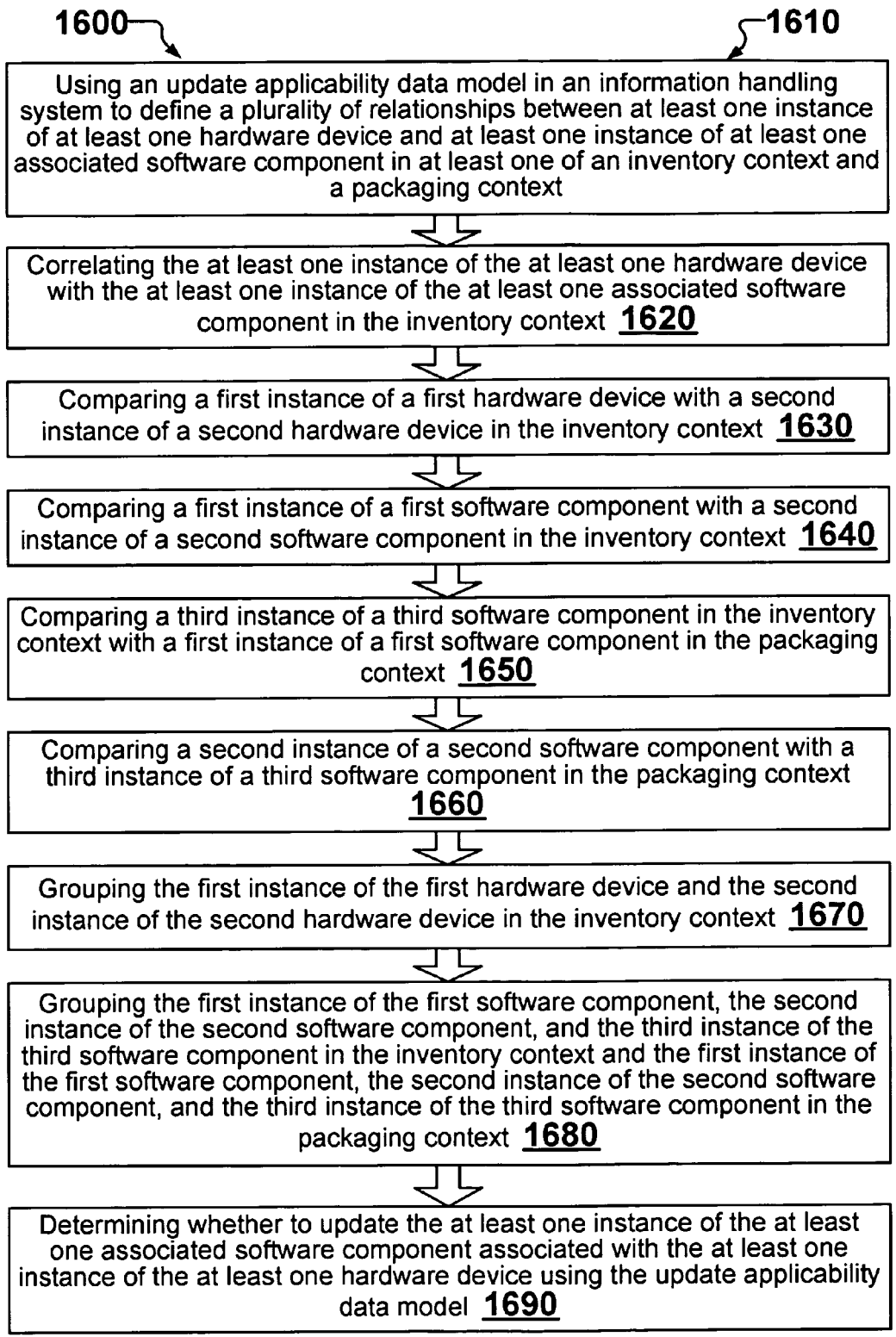
FIG. 16 schematically illustrates a method for automatic enforcement of firmware revision in an information handling system, according to teachings of the present disclosure.

In various illustrative embodiments, as shown in FIG. 16, a method 1600 of automatic enforcement of firmware revision in an information handling system may be provided. The method 1600 may comprise using an update applicability data model in an information handling system to define a plurality of relationships between at least one instance of at least one hardware device and at least one instance of at least one associated software component in at least one of an inventory context and a packaging context, as indicated at 1610. In various illustrative embodiments, the method 1600 may comprise using the update applicability data model in the information handling system to define the plurality of relationships between the at least one instance of the at least one hardware device and the at least one instance of the at least one associated software component in the at least one of the inventory context comprising the inventory of software installed on the at least one server and the packaging context comprising the catalog of the released software packages. In various particular illustrative embodiments, the method 1600 may comprise using the update applicability data model in the information handling system to define the plurality of relationships between the at least one instance of the at least one hardware device and the at least one instance of the at least one associated software component in the at least one of the inventory context comprising the inventory of software installed on the at least one server and the packaging context comprising the catalog comprising metadata for BIOS, firmware, and driver releases of the released software packages.

The method 1600 may also comprise correlating the at least one instance of the at least one hardware device with the at least one instance of the at least one associated software component in the inventory context, as indicated at 1620. In various illustrative embodiments, correlating the at least one instance of the at least one hardware device with the at least one instance of the at least one associated software component in the inventory context may further comprise determining which instances of associated software components are loaded for which instances of hardware devices and to which instances of the hardware devices the instances of the associated software are applicable. The method 1600 may also comprise comparing a first instance of a first hardware device with a second instance of a second hardware device in the inventory context, as indicated at 1630. In various illustrative embodiments, comparing the first instance of the first hardware device with the second instance of the second hardware device in the inventory context may further comprise determining whether the first instance of the first hardware device and the second instance of the second hardware device are the same type or a different type. The method 1600 may also comprise comparing a first instance of a first software component with a second instance of a second software component in the inventory context, as indicated at 1640. In various illustrative embodiments, comparing the first instance of the first software component with the second instance of the second software component in the inventory context may further comprise determining whether the first instance of the first software component and the second instance of the second software component have the same applicability.

The method 1600 may also comprise comparing a third instance of a third software component in the inventory context with a first instance of a first software component in the packaging context, as indicated at 1650. In various illustrative embodiments, comparing the third instance of the third software component in the inventory context with the first instance of the first software component in the packaging context may further comprise determining which update package is applicable to which instance of which hardware device in the information handling system and what revision differences there are between the third instance of the third software component in the inventory context with the first instance of the first software component in the packaging context and/or comparing a software entity in the inventory context with the same software entity in the packaging context. The method 1600 may also comprise comparing a second instance of a second software component with a third instance of a third software component in the packaging context, as indicated at 1660. In various illustrative embodiments, comparing the second instance of the second software component with the third instance of the third software component in the packaging context may further comprise determining whether a first update package and a second update package have different revisions of the same software or completely different software and/or comparing the same software entity in the packaging context.

The method 1600 may also comprise grouping the first instance of the first hardware device and the second instance of the second hardware device in the inventory context, as indicated at 1670. In various illustrative embodiments, grouping the first instance of the first hardware device and the second instance of the second hardware device in the inventory context may further comprise aligning with packaging preference. The method 1600 may also comprise grouping the first instance of the first software component, the second instance of the second software component, and the third instance of the third software component in the inventory context and the first instance of the first software component, the second instance of the second software component, and the third instance of the third software component in the packaging context, as indicated at 1680. In various illustrative embodiments, grouping the first instance of the first software component, the second instance of the second software component, and the third instance of the third software component in the inventory context and the first instance of the first software component, the second instance of the second software component, and the third instance of the third software component in the packaging context may further comprise aligning with packaging preference. The method 1600 may also comprise determining whether to update the at least one instance of the at least one associated software component associated with the at least one instance of the at least one hardware device using the update applicability data model, as indicated at 1690.

The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

Although various illustrative embodiments of the present invention and their advantages are described in detail, a person skilled in the art having the benefit of the present disclosure could make various alterations, additions, and/or omissions without departing from the spirit and scope of the present invention, as defined by the appended claims.

What is claimed is:

1. A computer implemented method for updating software in an information handling system, the method comprising:
using an update applicability data model in the information handling system to define a plurality of relationships between at least one instance of at least one hardware device and at least one instance of at least one associated software component of the information handling system in at least one of an inventory context and a packaging context, wherein the inventory context refers to a comprehensive list of hardware and software discovered on the information handling system and wherein the packaging context refers to a catalog of released software packages available for the information handling system;
correlating the at least one instance of the at least one hardware device with the at least one instance of the at least one associated software component in the inventory context to determine which instances of associated software components are loaded for which instances of hardware devices and to which instances of the hardware devices the instances of the associated software are applicable;
comparing a first instance of a first hardware device with a second instance of a second hardware device in the inventory context to determine whether the first instances of the first hardware device and the second instance of the second hardware device are of same type or a different type;
comparing a first instance of a first software component with a second instance of a second software component in the inventory context to determine whether the first instance of the first software component and the second instance of the second software component are of same type or a different type;
comparing a third instance of a third software component in the inventory context with a first instance of a first software component in the packaging context to determine which update package is applicable to which instance of which hardware device in the information handling system and what revision differences there are between the third instance of the third software component in the inventory context with the first instance of the first software component in the packaging context;
comparing a second instance of a second software component with a third instance of a third software component in the packaging context to determine whether a first update package and a second update package have different revisions of the same software or completely different software and comparing the same software entity in the packing context;
grouping the first instance of the first hardware device and the second instance of the second hardware device in the inventory context to align with packaging preference;
grouping the first instance of the first software component, the second instance of the second software component, and the third instance of the third software component in the inventory context and the first instance of the first software component, the second instance of the second software component, and the third instance of the third software component in the packaging context to align with packaging preference;
and determining whether to update the at least one instance of the at least one associated software component associated with the at least one instance of the at least one hardware device in the information handling system using the update applicability data model.

2. A computer implemented method for updating software in an information handling system, the method comprising:
using an update applicability data model in the information handling system to define a plurality of relationships between at least one instance of at least one hardware device and at least one instance of at least one associated software component of the information handling system in at least one of an inventory context and a packaging context comprising an inventory of all software and hardware installed on the information handling system and a packaging context comprising a catalog of released software updates, wherein the information handling system further comprises of at least one server;

correlating the at least one instance of the at least one hardware device with the at least one instance of the at least one associated software component in the inventory context to determine which instances of associated software components are loaded for which instances of hardware devices and to which instances of the hardware devices the instances of the associated software are applicable;

comparing a first instance of a first hardware device with a second instance of a second hardware device in the inventory context to determine whether the first instances of the first hardware device and the second instance of the second hardware device are of same type or a different type;

comparing a first instance of a first software component with a second instance of a second software component in the inventory context to determine whether the first instance of the first software component and the second instance of the second software component are of same type or a different type;

comparing a third instance of a third software component in the inventory context with a first instance of a first software component in the packaging context to determine which update package is applicable to which instance of which hardware device in the information handling system and what revision differences there are between the third instance of the third software component in the inventory context with the first instance of the first software component in the packaging context;

comparing a second instance of a second software component with a third instance of a third software component in the packaging context to determine whether a first update package and a second update package have different revisions of the same software or completely different software and comparing the same software entity in the packing context;

grouping the first instance of the first hardware device and the second instance of the second hardware device in the inventory context to align with packaging preference;

grouping the first instance of the first software component, the second instance of the second software component, and the third instance of the third software component in the inventory context and the first instance of the first software component, the second instance of the second software component, and the third instance of the third software component in the packaging context to align with packaging preference;

and determining whether to update the at least one instance of the at least one associated software component associated with the at least one instance of the at least one hardware device in the information handling system using the update applicability data model.

* * * * *